United States Patent
Seto et al.

(10) Patent No.: US 9,864,672 B2
(45) Date of Patent: Jan. 9, 2018

(54) MODULE SPECIFIC TRACING IN A SHARED MODULE ENVIRONMENT

(71) Applicant: Microsoft Technology Licensing, LLC, Redmond, WA (US)

(72) Inventors: Tetsuo Seto, Redmond, WA (US); Alexander G. Gounares, Kirkland, WA (US); Russell S. Krajec, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 115 days.

(21) Appl. No.: 15/068,996

(22) Filed: Mar. 14, 2016

(65) Prior Publication Data

US 2016/0196201 A1 Jul. 7, 2016

Related U.S. Application Data

(63) Continuation of application No. 14/455,156, filed on Aug. 8, 2014, now Pat. No. 9,292,415.
(Continued)

(51) Int. Cl.
*G06F 9/44* (2006.01)
*G06F 11/00* (2006.01)
(Continued)

(52) U.S. Cl.
CPC .......... *G06F 11/3636* (2013.01); *G06F 11/34* (2013.01); *G06F 11/3466* (2013.01);
(Continued)

(58) Field of Classification Search
CPC .. G06F 11/34; G06F 11/3409; G06F 11/3466; G06F 11/3636; G06F 11/3664; G06F 21/12; G06F 21/31; G06F 2201/865
(Continued)

(56) References Cited

U.S. PATENT DOCUMENTS 4,907,151 A 3/1990 Bartlett
5,293,620 A 3/1994 Barabash et al.
(Continued)

FOREIGN PATENT DOCUMENTS

CN 1527968 9/2004
CN 101595457 12/2009
(Continued)

OTHER PUBLICATIONS

Ohinese Office Action issued in Cn Application No. 201380072863.3 dated Apr. 6, 2017.
(Continued)

*Primary Examiner* — Qing Chen
(74) *Attorney, Agent, or Firm* — Workman Nydegger

(57) ABSTRACT

Visualizing execution of an application in a trace coverage graph includes receiving module trace data gathered during execution of an executable module. The module trace data includes data representing sequences of execution between individual executable components. A trace coverage graph is generated and displayed from the module trace data. The trace coverage graph includes graph nodes that each correspond to a different executable component. The trace coverage graph also includes graph edges that each visually connects two of the graph nodes. Each graph edge visually indicates an amount of trace data present for the sequence of execution between the graph nodes that are connected by the graph edge. Thicker graph edges represent the presence of a larger amount of trace data, and thinner graph edges represent the presence of a lesser amount of trace data.

30 Claims, 11 Drawing Sheets

Related U.S. Application Data

(60) Provisional application No. 61/873,773, filed on Sep. 4, 2013.

(51) Int. Cl.
*G06F 11/36* (2006.01)
*G06F 21/31* (2013.01)
*G06F 21/12* (2013.01)
*G06F 11/34* (2006.01)

(52) U.S. Cl.
CPC .......... *G06F 11/3664* (2013.01); *G06F 21/12* (2013.01); *G06F 21/31* (2013.01); *G06F 11/3409* (2013.01); *G06F 2201/865* (2013.01)

(58) Field of Classification Search
USPC .......................... 717/124–135; 714/37, 38.1
See application file for complete search history.

(56) References Cited

U.S. PATENT DOCUMENTS

| | | |
|---|---|---|
| 5,327,568 A | 7/1994 | Maejima et al. |
| 5,369,570 A | 11/1994 | Parad |
| 5,535,393 A | 7/1996 | Reeve et al. |
| 5,606,688 A | 2/1997 | McNutt et al. |
| 5,642,511 A | 6/1997 | Chow et al. |
| 5,689,363 A | 11/1997 | Kleber et al. |
| 5,732,277 A | 3/1998 | Kodosky et al. |
| 5,740,440 A | 4/1998 | West |
| 5,758,183 A | 5/1998 | Scales |
| 5,778,004 A | 7/1998 | Jennion et al. |
| 5,835,085 A | 11/1998 | Eick et al. |
| 5,852,449 A | 12/1998 | Esslinger et al. |
| 5,870,606 A | 2/1999 | Lindsey |
| 5,937,194 A | 8/1999 | Sundaresan |
| 5,946,488 A | 8/1999 | Tanguay et al. |
| 5,953,736 A | 9/1999 | O'Connor et al. |
| 5,978,830 A | 11/1999 | Nakaya et al. |
| 5,999,192 A | 12/1999 | Selfridge et al. |
| 6,003,143 A | 12/1999 | Kim et al. |
| 6,026,362 A | 2/2000 | Kim et al. |
| 6,032,201 A | 2/2000 | Tillery et al. |
| 6,038,395 A | 3/2000 | Chow et al. |
| 6,059,842 A | 5/2000 | Dumarot et al. |
| 6,083,281 A | 7/2000 | Diec |
| 6,108,340 A | 8/2000 | Rolfe |
| 6,158,049 A | 12/2000 | Goodwin |
| 6,195,676 B1 | 2/2001 | Spix et al. |
| 6,202,199 B1 | 3/2001 | Wygodny et al. |
| 6,219,826 B1 | 4/2001 | De Pauw et al. |
| 6,226,787 B1 | 5/2001 | Serra et al. |
| 6,230,313 B1 | 5/2001 | Callahan |
| 6,243,857 B1 | 6/2001 | Logan et al. |
| 6,266,804 B1 | 7/2001 | Isman |
| 6,282,701 B1 | 8/2001 | Wygodny et al. |
| 6,286,130 B1 | 9/2001 | Poulsen |
| 6,321,204 B1 | 11/2001 | Kazami et al. |
| 6,321,240 B1 | 11/2001 | Chilimbi et al. |
| 6,374,271 B1 | 4/2002 | Shimizu |
| 6,381,735 B1 | 4/2002 | Hunt |
| 6,584,487 B1 | 6/2003 | Saboff |
| 6,598,141 B1 | 7/2003 | Dussud et al. |
| 6,629,128 B1 | 9/2003 | Glass |
| 6,661,431 B1 | 12/2003 | Stuart |
| 6,662,358 B1 | 12/2003 | Berry et al. |
| 6,681,384 B1 | 1/2004 | Bates et al. |
| 6,735,687 B1 | 5/2004 | Kok |
| 6,742,003 B2 | 5/2004 | Heckerman et al. |
| 6,748,420 B1 | 6/2004 | Quatrano et al. |
| 6,748,585 B2 | 6/2004 | Proebsting |
| 6,754,890 B1 | 6/2004 | Berry et al. |
| 6,775,423 B2 | 8/2004 | Kulkarni |
| 6,792,460 B2 | 9/2004 | Oulu |
| 6,792,595 B1 | 9/2004 | Storistenau et al. |
| 6,826,752 B1 | 11/2004 | Thornley et al. |
| 6,856,950 B1 | 2/2005 | Abts et al. |
| 6,862,727 B2 | 3/2005 | Stevens |
| 6,892,226 B1 | 5/2005 | Tso et al. |
| 6,928,488 B1 | 8/2005 | De Jong et al. |
| 6,938,186 B2 | 8/2005 | Das et al. |
| 6,970,805 B1 | 11/2005 | Bierma et al. |
| 6,981,265 B1 | 12/2005 | Rees et al. |
| 7,058,928 B2 | 6/2006 | Wygodny et al. |
| 7,065,763 B1 | 6/2006 | Martin et al. |
| 7,093,234 B2 | 8/2006 | Hibbeler et al. |
| 7,117,504 B2 | 10/2006 | Smith et al. |
| 7,120,901 B2 | 10/2006 | Ferri et al. |
| 7,143,412 B2 | 11/2006 | Koenen |
| 7,168,068 B2 | 1/2007 | Dawson |
| 7,174,536 B1 | 2/2007 | Kothari et al. |
| 7,185,367 B2 | 2/2007 | Munson |
| 7,194,664 B1 | 3/2007 | Fung et al. |
| 7,203,925 B1 | 4/2007 | Michael et al. |
| 7,219,300 B2 | 5/2007 | Arquie |
| 7,386,839 B1 | 6/2008 | Golender et al. |
| 7,389,494 B1 | 6/2008 | Cantrill |
| 7,430,733 B1 | 9/2008 | Yaari |
| 7,468,727 B2 | 12/2008 | Wong |
| 7,472,378 B2 | 12/2008 | Bennett |
| 7,478,371 B1 | 1/2009 | Gove |
| 7,493,400 B2 | 2/2009 | Loaiza |
| 7,500,216 B1 | 3/2009 | Blunno et al. |
| 7,509,343 B1 | 3/2009 | Washburn |
| 7,543,281 B2 | 6/2009 | King et al. |
| 7,574,675 B1 | 8/2009 | Linker |
| 7,580,905 B2 | 8/2009 | Lopez-Estrada |
| 7,607,169 B1 | 10/2009 | Njemanze et al. |
| 7,620,947 B2 | 11/2009 | Krishnaswamy |
| 7,624,380 B2 | 11/2009 | Okada |
| 7,639,256 B1 | 12/2009 | Yablonski |
| 7,650,574 B2 | 1/2010 | Nattinger |
| 7,657,873 B2 | 2/2010 | Horton et al. |
| 7,681,182 B1 | 3/2010 | Mistry et al. |
| 7,681,188 B1 | 3/2010 | Tirumalai et al. |
| 7,685,561 B2 | 3/2010 | Deem et al. |
| 7,739,667 B2 | 6/2010 | Callahan et al. |
| 7,743,380 B2 | 6/2010 | Seidman et al. |
| 7,788,640 B2 | 8/2010 | Grimaldi |
| 7,797,585 B1 | 9/2010 | Sahin et al. |
| 7,814,453 B2 | 10/2010 | Stevens et al. |
| 7,827,539 B1 | 11/2010 | Wygodny et al. |
| 7,853,930 B2 | 12/2010 | Mitchell et al. |
| 7,865,872 B2 | 1/2011 | Chamieh et al. |
| 7,870,244 B2 | 1/2011 | Chong et al. |
| 7,890,771 B2 | 2/2011 | England et al. |
| 7,954,094 B2 | 5/2011 | Cascaval et al. |
| 7,954,095 B2 | 5/2011 | Archer et al. |
| 7,971,010 B2 | 6/2011 | Schmelter et al. |
| 8,024,708 B2 | 9/2011 | Demetriou |
| 8,032,866 B1 | 10/2011 | Golender et al. |
| 8,037,465 B2 | 10/2011 | Tian |
| 8,056,059 B2 | 11/2011 | Chockler |
| 8,069,145 B2 | 11/2011 | Surtani |
| 8,108,689 B2 | 1/2012 | Nicolson et al. |
| 8,132,162 B2 | 3/2012 | Peterson |
| 8,214,806 B2 | 7/2012 | Cong et al. |
| 8,234,105 B1 | 7/2012 | Aldrich et al. |
| 8,286,142 B2 | 10/2012 | Fjeldstad et al. |
| 8,312,056 B1 | 11/2012 | Peng et al. |
| 8,312,435 B2 | 11/2012 | Wygodny et al. |
| 8,316,354 B2 | 11/2012 | Vanrenen |
| 8,336,056 B1 | 12/2012 | Gadir |
| 8,359,584 B2 | 1/2013 | Rao et al. |
| 8,381,178 B2 | 2/2013 | Martino et al. |
| 8,406,565 B1 | 3/2013 | Schildan |
| 8,473,925 B2 | 6/2013 | Gagliardi et al. |
| 8,490,055 B2 | 7/2013 | Basak |
| 8,490,087 B2 | 7/2013 | Beaty et al. |
| 8,495,598 B2 | 7/2013 | Gounares et al. |
| 8,516,443 B2 | 8/2013 | Li |
| 8,543,907 B1 | 9/2013 | Roskind |
| 8,543,983 B2 | 9/2013 | Murthy |
| 8,566,800 B2 | 10/2013 | Gagliardi |
| 8,566,804 B1 | 10/2013 | Carrick et al. |

(56) References Cited

U.S. PATENT DOCUMENTS

| | | |
|---|---|---|
| 8,572,575 B2 | 10/2013 | Berlyant et al. |
| 8,595,327 B2 | 11/2013 | Lee et al. |
| 8,595,743 B2 | 11/2013 | Gounares et al. |
| 8,607,018 B2 | 12/2013 | Gounares et al. |
| 8,615,766 B2 | 12/2013 | Gounares et al. |
| 8,640,100 B2 | 1/2014 | Neumann et al. |
| 8,640,104 B2 | 1/2014 | McEntee |
| 8,645,930 B2 | 2/2014 | Lattner et al. |
| 8,650,538 B2 | 2/2014 | Gounares et al. |
| 8,656,134 B2 | 2/2014 | Gounares et al. |
| 8,656,135 B2 | 2/2014 | Gounares et al. |
| 8,656,359 B2 | 2/2014 | Savov |
| 8,656,378 B2 | 2/2014 | Gounares et al. |
| 8,681,155 B2 | 3/2014 | Basak |
| 8,694,574 B2 | 4/2014 | Gounares et al. |
| 8,700,838 B2 | 4/2014 | Gounares et al. |
| 8,707,326 B2 | 4/2014 | Garrett |
| 8,713,064 B1 | 4/2014 | Khafizov |
| 8,726,255 B2 | 5/2014 | Gounares et al. |
| 8,745,591 B2 | 6/2014 | De Smet et al. |
| 8,745,594 B1 | 6/2014 | Iossiphidis |
| 8,752,021 B2 | 6/2014 | Li et al. |
| 8,752,034 B2 | 6/2014 | Gounares et al. |
| 8,756,581 B2 | 6/2014 | Castanos et al. |
| 8,789,030 B2 | 7/2014 | Gounares et al. |
| 8,789,032 B1 | 7/2014 | Li et al. |
| 8,793,656 B2 | 7/2014 | Huang |
| 8,793,669 B2 | 7/2014 | Garrett |
| 8,924,941 B2 | 12/2014 | Krajec et al. |
| 8,943,441 B1 | 1/2015 | Patrick |
| 8,997,056 B2 | 3/2015 | Li et al. |
| 9,015,668 B1 | 4/2015 | Michelsen |
| 9,203,894 B1 | 12/2015 | Ginzburg |
| 9,497,136 B1 | 11/2016 | Ramarao |
| 2001/0003822 A1 | 6/2001 | Hibi et al. |
| 2001/0034859 A1 | 10/2001 | Swoboda |
| 2001/0056456 A1 | 12/2001 | Cota-Robles |
| 2002/0007297 A1 | 1/2002 | Clarke |
| 2002/0019887 A1 | 2/2002 | Moore |
| 2002/0072830 A1 | 6/2002 | Hunt |
| 2002/0073063 A1 | 6/2002 | Faraj |
| 2002/0085041 A1 | 7/2002 | Ishikawa |
| 2002/0087949 A1 | 7/2002 | Golender et al. |
| 2002/0112033 A1 | 8/2002 | Doemling et al. |
| 2002/0120815 A1 | 8/2002 | Zahavi |
| 2002/0138788 A1 | 9/2002 | Yenne et al. |
| 2002/0156724 A1* | 10/2002 | Levchin ............... G06Q 20/10 705/39 |
| 2002/0157086 A1 | 10/2002 | Lewis et al. |
| 2002/0163498 A1 | 11/2002 | Chang et al. |
| 2002/0165901 A1 | 11/2002 | Rajan |
| 2002/0178185 A1 | 11/2002 | Kuchinsky et al. |
| 2002/0184615 A1 | 12/2002 | Sumner |
| 2002/0196184 A1 | 12/2002 | Johnson et al. |
| 2002/0196229 A1 | 12/2002 | Chen et al. |
| 2002/0199172 A1 | 12/2002 | Bunnell |
| 2002/0199179 A1 | 12/2002 | Lavery et al. |
| 2003/0023576 A1 | 1/2003 | Gilson |
| 2003/0037248 A1 | 2/2003 | Launchbury et al. |
| 2003/0041069 A1 | 2/2003 | Yorke |
| 2003/0056201 A1 | 3/2003 | Degenaro et al. |
| 2003/0058277 A1 | 3/2003 | Bowman-Amuah |
| 2003/0061574 A1 | 3/2003 | Saluja et al. |
| 2003/0067481 A1 | 4/2003 | Chedgey et al. |
| 2003/0070161 A1 | 4/2003 | Wong et al. |
| 2003/0088606 A1 | 5/2003 | Miller et al. |
| 2003/0088854 A1 | 5/2003 | Wygodny et al. |
| 2003/0093408 A1 | 5/2003 | Brown et al. |
| 2003/0106046 A1 | 6/2003 | Arnold |
| 2003/0140280 A1 | 7/2003 | Kaler et al. |
| 2003/0145314 A1 | 7/2003 | Nguyen et al. |
| 2003/0149765 A1 | 8/2003 | Hubbard |
| 2003/0217155 A1 | 11/2003 | Greck et al. |
| 2003/0231207 A1 | 12/2003 | Huang |
| 2004/0012638 A1 | 1/2004 | Donnelli et al. |
| 2004/0015600 A1 | 1/2004 | Tiwary et al. |
| 2004/0015929 A1 | 1/2004 | Lewis et al. |
| 2004/0034853 A1 | 2/2004 | Gibbons et al. |
| 2004/0054992 A1 | 3/2004 | Nair et al. |
| 2004/0073529 A1 | 4/2004 | Stanfill |
| 2004/0075690 A1 | 4/2004 | Cirne |
| 2004/0083425 A1 | 4/2004 | Dorwart |
| 2004/0088699 A1 | 5/2004 | Suresh |
| 2004/0103400 A1 | 5/2004 | Johnsen |
| 2004/0103410 A1 | 5/2004 | Sakai |
| 2004/0117172 A1 | 6/2004 | Shibata |
| 2004/0117768 A1 | 6/2004 | Chang et al. |
| 2004/0123274 A1 | 6/2004 | Inagaki et al. |
| 2004/0128093 A1 | 7/2004 | Cragun et al. |
| 2004/0139480 A1 | 7/2004 | Delpuch et al. |
| 2004/0154016 A1 | 8/2004 | Randall |
| 2004/0154019 A1 | 8/2004 | Aamodt et al. |
| 2004/0181554 A1 | 9/2004 | Heckerman et al. |
| 2004/0194098 A1 | 9/2004 | Chung et al. |
| 2004/0205302 A1 | 10/2004 | Cantrill |
| 2004/0205718 A1 | 10/2004 | Reynders |
| 2004/0225443 A1 | 11/2004 | Kamps |
| 2004/0239681 A1 | 12/2004 | Robotham et al. |
| 2005/0015368 A1 | 1/2005 | Payton et al. |
| 2005/0021318 A1 | 1/2005 | Inoue et al. |
| 2005/0041692 A1 | 2/2005 | Kallstenius |
| 2005/0066149 A1 | 3/2005 | Kanade |
| 2005/0091645 A1 | 4/2005 | Chilimbi et al. |
| 2005/0091646 A1 | 4/2005 | Chilimbi et al. |
| 2005/0102636 A1 | 5/2005 | McKeon |
| 2005/0108259 A1 | 5/2005 | Watanabe et al. |
| 2005/0108517 A1 | 5/2005 | Dillon et al. |
| 2005/0120333 A1 | 6/2005 | Inoue et al. |
| 2005/0131995 A1 | 6/2005 | Chase et al. |
| 2005/0138111 A1 | 6/2005 | Aton et al. |
| 2005/0149697 A1 | 7/2005 | Enright et al. |
| 2005/0149912 A1 | 7/2005 | Farcy et al. |
| 2005/0155019 A1 | 7/2005 | Levine et al. |
| 2005/0177820 A1 | 8/2005 | Mei et al. |
| 2005/0177836 A1 | 8/2005 | Lari et al. |
| 2005/0180330 A1 | 8/2005 | Shapiro |
| 2005/0188272 A1 | 8/2005 | Bodorin et al. |
| 2005/0198332 A1 | 9/2005 | Laertz et al. |
| 2005/0204344 A1 | 9/2005 | Shinomi |
| 2005/0234974 A1 | 10/2005 | Bailey et al. |
| 2005/0240567 A1 | 10/2005 | Klosterhalfen |
| 2005/0262181 A1 | 11/2005 | Schmidt et al. |
| 2005/0262470 A1 | 11/2005 | Gavrilov |
| 2005/0262493 A1 | 11/2005 | Schmidt et al. |
| 2005/0262512 A1 | 11/2005 | Schmidt et al. |
| 2005/0278208 A1 | 12/2005 | Schultz |
| 2006/0005179 A1 | 1/2006 | Kawahara |
| 2006/0005194 A1 | 1/2006 | Kawahara |
| 2006/0013134 A1 | 1/2006 | Neuse |
| 2006/0015612 A1 | 1/2006 | Shimazaki et al. |
| 2006/0015850 A1 | 1/2006 | Poole |
| 2006/0037022 A1 | 2/2006 | Byrd et al. |
| 2006/0047752 A1 | 3/2006 | Hornby |
| 2006/0074970 A1 | 4/2006 | Narayanan |
| 2006/0075390 A1 | 4/2006 | McAllister |
| 2006/0101033 A1 | 5/2006 | Hu et al. |
| 2006/0101416 A1 | 5/2006 | Callahan et al. |
| 2006/0101467 A1 | 5/2006 | Buco et al. |
| 2006/0106843 A1 | 5/2006 | Middelfart et al. |
| 2006/0106926 A1 | 5/2006 | Kato et al. |
| 2006/0130016 A1 | 6/2006 | Wagner |
| 2006/0156017 A1 | 7/2006 | McIsaac et al. |
| 2006/0167939 A1 | 7/2006 | Seidman et al. |
| 2006/0168583 A1 | 7/2006 | Basso et al. |
| 2006/0174165 A1 | 8/2006 | Shaffer et al. |
| 2006/0179429 A1 | 8/2006 | Eggers et al. |
| 2006/0182133 A1 | 8/2006 | Choumaru |
| 2006/0190596 A1 | 8/2006 | Horikawa |
| 2006/0195747 A1 | 8/2006 | Pramanick et al. |
| 2006/0200738 A1 | 9/2006 | Tarle et al. |
| 2006/0212852 A1 | 9/2006 | Hwang |
| 2006/0224375 A1 | 10/2006 | Barnett et al. |
| 2006/0230319 A1 | 10/2006 | Ryali et al. |
| 2006/0242627 A1 | 10/2006 | Wygodny et al. |

(56) References Cited

U.S. PATENT DOCUMENTS

| | | |
|---|---|---|
| 2006/0248177 A1 | 11/2006 | Dostert et al. |
| 2006/0256805 A1 | 11/2006 | Cho et al. |
| 2006/0265397 A1 | 11/2006 | Bryan et al. |
| 2006/0277477 A1 | 12/2006 | Christenson |
| 2007/0006159 A1 | 1/2007 | Hecht et al. |
| 2007/0016949 A1 | 1/2007 | Dunagan et al. |
| 2007/0022000 A1 | 1/2007 | Bodart et al. |
| 2007/0028189 A1 | 2/2007 | Robbins |
| 2007/0050174 A1 | 3/2007 | Dewitt et al. |
| 2007/0060205 A1 | 3/2007 | Kim |
| 2007/0061241 A1 | 3/2007 | Jovanovic et al. |
| 2007/0079298 A1 | 4/2007 | Tian et al. |
| 2007/0089094 A1 | 4/2007 | Levine et al. |
| 2007/0100967 A1 | 5/2007 | Smith et al. |
| 2007/0118538 A1 | 5/2007 | Ahem et al. |
| 2007/0118909 A1 | 5/2007 | Hertzog |
| 2007/0136201 A1 | 6/2007 | Sah et al. |
| 2007/0136320 A1 | 6/2007 | Sah et al. |
| 2007/0136337 A1 | 6/2007 | Sah et al. |
| 2007/0136443 A1 | 6/2007 | Sah et al. |
| 2007/0140131 A1 | 6/2007 | Malloy et al. |
| 2007/0143795 A1 | 6/2007 | Tran |
| 2007/0150895 A1 | 6/2007 | Kurland |
| 2007/0157177 A1 | 7/2007 | Bouguet et al. |
| 2007/0168992 A1 | 7/2007 | Cary |
| 2007/0169002 A1 | 7/2007 | Kronlund et al. |
| 2007/0169042 A1 | 7/2007 | Janczewski |
| 2007/0180147 A1 | 8/2007 | Leigh |
| 2007/0192468 A1 | 8/2007 | Keeler |
| 2007/0198524 A1 | 8/2007 | Branda et al. |
| 2007/0198952 A1 | 8/2007 | Pittenger |
| 2007/0204010 A1 | 8/2007 | Sah et al. |
| 2007/0204223 A1 | 8/2007 | Bartels et al. |
| 2007/0214333 A1 | 9/2007 | Nijhawan et al. |
| 2007/0220513 A1 | 9/2007 | Hwang |
| 2007/0226696 A1 | 9/2007 | Radhakrishnan et al. |
| 2007/0226700 A1 | 9/2007 | Gal |
| 2007/0226758 A1 | 9/2007 | Waldo et al. |
| 2007/0234002 A1 | 10/2007 | Litke |
| 2007/0239528 A1 | 10/2007 | Xie et al. |
| 2007/0245310 A1 | 10/2007 | Rosenstein et al. |
| 2007/0260849 A1 | 11/2007 | Chen et al. |
| 2007/0271283 A1 | 11/2007 | Maryka et al. |
| 2007/0277056 A1 | 11/2007 | Varadarajan et al. |
| 2007/0294581 A1 | 12/2007 | Dean et al. |
| 2008/0005281 A1 | 1/2008 | Hsueh et al. |
| 2008/0022285 A1 | 1/2008 | Cherkasova et al. |
| 2008/0022286 A1 | 1/2008 | Chung et al. |
| 2008/0049022 A1 | 2/2008 | Sherb et al. |
| 2008/0065668 A1 | 3/2008 | Spence et al. |
| 2008/0092121 A1 | 4/2008 | DeRose et al. |
| 2008/0092128 A1 | 4/2008 | Corry et al. |
| 2008/0098180 A1 | 4/2008 | Larson et al. |
| 2008/0104225 A1 | 5/2008 | Zhang |
| 2008/0104362 A1 | 5/2008 | Buros et al. |
| 2008/0104451 A1 | 5/2008 | Blanchard et al. |
| 2008/0104570 A1 | 5/2008 | Chedgey et al. |
| 2008/0109792 A1 | 5/2008 | O'Dowd |
| 2008/0117216 A1 | 5/2008 | Dorie |
| 2008/0120400 A1 | 5/2008 | Keller et al. |
| 2008/0126003 A1 | 5/2008 | Goldstein et al. |
| 2008/0126828 A1 | 5/2008 | Girouard et al. |
| 2008/0127108 A1 | 5/2008 | Ivanov et al. |
| 2008/0127109 A1 | 5/2008 | Simeon |
| 2008/0127112 A1 | 5/2008 | Kettley et al. |
| 2008/0127116 A1 | 5/2008 | Kosche et al. |
| 2008/0127149 A1 | 5/2008 | Kosche et al. |
| 2008/0140985 A1 | 6/2008 | Kitamorn et al. |
| 2008/0155348 A1 | 6/2008 | Ivanov et al. |
| 2008/0155349 A1 | 6/2008 | Ivanov et al. |
| 2008/0163124 A1 | 7/2008 | Bonev et al. |
| 2008/0163183 A1 | 7/2008 | Li et al. |
| 2008/0168472 A1 | 7/2008 | Wilson |
| 2008/0243970 A1 | 10/2008 | Schmelter et al. |
| 2008/0256233 A1 | 10/2008 | Hall |
| 2008/0256466 A1 | 10/2008 | Salvador et al. |
| 2008/0256518 A1 | 10/2008 | Aoshima et al. |
| 2008/0271038 A1 | 10/2008 | Rolia et al. |
| 2008/0276129 A1 | 11/2008 | Cocker et al. |
| 2008/0282232 A1 | 11/2008 | Cong et al. |
| 2008/0288212 A1 | 11/2008 | Greifeneder |
| 2008/0288741 A1 | 11/2008 | Lee et al. |
| 2008/0312980 A1 | 12/2008 | Boulineau et al. |
| 2008/0313502 A1 | 12/2008 | Mcfadden et al. |
| 2009/0019449 A1 | 1/2009 | Choi et al. |
| 2009/0037407 A1 | 2/2009 | Yang et al. |
| 2009/0037873 A1 | 2/2009 | Ahadian et al. |
| 2009/0049428 A1 | 2/2009 | Cozmei |
| 2009/0055802 A1 | 2/2009 | Crosby |
| 2009/0089765 A1 | 4/2009 | Guo et al. |
| 2009/0106746 A1 | 4/2009 | Chaudhuri et al. |
| 2009/0113399 A1 | 4/2009 | Tzoref et al. |
| 2009/0125519 A1 | 5/2009 | Robison et al. |
| 2009/0138858 A1 | 5/2009 | Livshits et al. |
| 2009/0150874 A1 | 6/2009 | Chung et al. |
| 2009/0157723 A1 | 6/2009 | De et al. |
| 2009/0165016 A1 | 6/2009 | Bell |
| 2009/0177642 A1 | 7/2009 | Chung et al. |
| 2009/0193402 A1 | 7/2009 | Bashkansky et al. |
| 2009/0199047 A1 | 8/2009 | Vaitheeswaran et al. |
| 2009/0271729 A1 | 10/2009 | Killoren |
| 2009/0276288 A1 | 11/2009 | Hlavac et al. |
| 2009/0307630 A1 | 12/2009 | Kawai et al. |
| 2009/0313525 A1 | 12/2009 | Savin et al. |
| 2009/0313600 A1 | 12/2009 | Ayers et al. |
| 2009/0319996 A1 | 12/2009 | Shafi et al. |
| 2010/0005249 A1 | 1/2010 | Bates et al. |
| 2010/0011341 A1 | 1/2010 | Baierl et al. |
| 2010/0042944 A1 | 2/2010 | Robinson et al. |
| 2010/0049941 A1 | 2/2010 | Howard |
| 2010/0064279 A1 | 3/2010 | Stewart |
| 2010/0070505 A1 | 3/2010 | Kao et al. |
| 2010/0077388 A1 | 3/2010 | Kimura |
| 2010/0083178 A1 | 4/2010 | Zui et al. |
| 2010/0083185 A1 | 4/2010 | Sakai et al. |
| 2010/0088665 A1 | 4/2010 | Langworthy et al. |
| 2010/0106920 A1 | 4/2010 | Anckaert et al. |
| 2010/0115172 A1 | 5/2010 | Gillingham et al. |
| 2010/0123717 A1 | 5/2010 | Jiao |
| 2010/0125565 A1 | 5/2010 | Burger et al. |
| 2010/0125838 A1 | 5/2010 | Kuusilinna et al. |
| 2010/0131945 A1 | 5/2010 | Zeort |
| 2010/0134501 A1 | 6/2010 | Lowe |
| 2010/0138431 A1 | 6/2010 | Bator et al. |
| 2010/0146489 A1 | 6/2010 | Ortiz |
| 2010/0153786 A1 | 6/2010 | Matsukawa |
| 2010/0167256 A1 | 7/2010 | Blash |
| 2010/0180245 A1 | 7/2010 | Rutten |
| 2010/0180346 A1 | 7/2010 | Nicolson et al. |
| 2010/0205583 A1 | 8/2010 | Gebhardt et al. |
| 2010/0223581 A1 | 9/2010 | Manolescu et al. |
| 2010/0235771 A1 | 9/2010 | Gregg, III |
| 2010/0251220 A1 | 9/2010 | Jeong |
| 2010/0257019 A1 | 10/2010 | Chickering et al. |
| 2010/0262832 A1 | 10/2010 | Tie et al. |
| 2010/0268816 A1 | 10/2010 | Tarui et al. |
| 2010/0281458 A1 | 11/2010 | Paladino et al. |
| 2010/0281468 A1 | 11/2010 | Pavlyushchik |
| 2010/0281488 A1 | 11/2010 | Krishnamurthy et al. |
| 2010/0287541 A1 | 11/2010 | Saunders et al. |
| 2010/0295856 A1 | 11/2010 | Ferreira et al. |
| 2010/0299671 A1 | 11/2010 | Kinsey |
| 2010/0306854 A1 | 12/2010 | Neergaard |
| 2010/0318994 A1 | 12/2010 | Holmberg |
| 2010/0333039 A1 | 12/2010 | Denkel |
| 2011/0004443 A1 | 1/2011 | Horikawa |
| 2011/0004598 A1 | 1/2011 | Kikuchi |
| 2011/0055815 A1 | 3/2011 | Squillace |
| 2011/0066973 A1 | 3/2011 | Plom et al. |
| 2011/0067008 A1 | 3/2011 | Srivastava et al. |
| 2011/0072309 A1 | 3/2011 | Sakai et al. |
| 2011/0072420 A1 | 3/2011 | Cha et al. |
| 2011/0078487 A1 | 3/2011 | Nielsen et al. |
| 2011/0088021 A1 | 4/2011 | Kruglick |

(56) References Cited

U.S. PATENT DOCUMENTS

| | | |
|---|---|---|
| 2011/0088038 A1 | 4/2011 | Kruglick |
| 2011/0098973 A1 | 4/2011 | Seidman |
| 2011/0126286 A1 | 5/2011 | Nazarov |
| 2011/0138363 A1 | 6/2011 | Schmelter et al. |
| 2011/0138365 A1 | 6/2011 | Schmelter et al. |
| 2011/0153603 A1 | 6/2011 | Adiba et al. |
| 2011/0153817 A1 | 6/2011 | Wright et al. |
| 2011/0154289 A1 | 6/2011 | Mannarswamy et al. |
| 2011/0154296 A1 | 6/2011 | Marenco |
| 2011/0154300 A1 | 6/2011 | Rao et al. |
| 2011/0167414 A1 | 7/2011 | Lattner et al. |
| 2011/0191343 A1 | 8/2011 | Heaton |
| 2011/0202907 A1 | 8/2011 | Dice et al. |
| 2011/0209153 A1 | 8/2011 | Suzuki et al. |
| 2011/0225458 A1 | 9/2011 | Zuo |
| 2011/0249002 A1 | 10/2011 | Duplessis et al. |
| 2011/0258608 A1 | 10/2011 | Li et al. |
| 2011/0258611 A1 | 10/2011 | Dutta et al. |
| 2011/0258612 A1 | 10/2011 | Matthiesen et al. |
| 2011/0276951 A1 | 11/2011 | Jain |
| 2011/0283263 A1 | 11/2011 | Gagliardi et al. |
| 2011/0289485 A1 | 11/2011 | Mejdrich et al. |
| 2011/0314343 A1 | 12/2011 | Hoke et al. |
| 2011/0314448 A1 | 12/2011 | Biggerstaff et al. |
| 2011/0314543 A1 | 12/2011 | Treit et al. |
| 2012/0011519 A1 | 1/2012 | Ganesh |
| 2012/0017123 A1 | 1/2012 | Masser et al. |
| 2012/0023475 A1 | 1/2012 | Surazski et al. |
| 2012/0042212 A1 | 2/2012 | Laurenti |
| 2012/0042269 A1 | 2/2012 | Holman |
| 2012/0047421 A1 | 2/2012 | Holman |
| 2012/0060142 A1 | 3/2012 | Fliess et al. |
| 2012/0072579 A1 | 3/2012 | Teather |
| 2012/0079108 A1 | 3/2012 | Findeisen |
| 2012/0079456 A1 | 3/2012 | Kannan et al. |
| 2012/0079460 A1 | 3/2012 | Cho et al. |
| 2012/0102029 A1 | 4/2012 | Larson et al. |
| 2012/0110555 A1 | 5/2012 | Bates |
| 2012/0117438 A1 | 5/2012 | Shaffer et al. |
| 2012/0137240 A1 | 5/2012 | Krueger |
| 2012/0137273 A1 | 5/2012 | Meijler et al. |
| 2012/0144374 A1 | 6/2012 | Gallagher |
| 2012/0151396 A1 | 6/2012 | S. et al. |
| 2012/0159091 A1 | 6/2012 | Li et al. |
| 2012/0159116 A1 | 6/2012 | Lim et al. |
| 2012/0159391 A1 | 6/2012 | Berry et al. |
| 2012/0159454 A1 | 6/2012 | Barham et al. |
| 2012/0167081 A1 | 6/2012 | Sedayao et al. |
| 2012/0173703 A1 | 7/2012 | Lingen |
| 2012/0197868 A1 | 8/2012 | Fauser et al. |
| 2012/0198423 A1 | 8/2012 | Bestgen et al. |
| 2012/0204156 A1 | 8/2012 | Kettley et al. |
| 2012/0221314 A1 | 8/2012 | Bourlatchkov et al. |
| 2012/0222019 A1 | 8/2012 | Gounares et al. |
| 2012/0222043 A1 | 8/2012 | Gounares et al. |
| 2012/0227040 A1 | 9/2012 | Gounares |
| 2012/0233310 A1 | 9/2012 | Agarwala et al. |
| 2012/0233592 A1 | 9/2012 | Gounares |
| 2012/0233601 A1 | 9/2012 | Gounares |
| 2012/0246303 A1 | 9/2012 | Petersen |
| 2012/0254266 A1 | 10/2012 | Printezis et al. |
| 2012/0254900 A1 | 10/2012 | Kumar |
| 2012/0259962 A1 | 10/2012 | Bose et al. |
| 2012/0260135 A1 | 10/2012 | Beck et al. |
| 2012/0266014 A1 | 10/2012 | Bhoovaraghavan et al. |
| 2012/0266143 A1 | 10/2012 | Bhoovaraghavan et al. |
| 2012/0278504 A1 | 11/2012 | Ang et al. |
| 2012/0278594 A1 | 11/2012 | Kumar |
| 2012/0278793 A1 | 11/2012 | Jalan |
| 2012/0290672 A1 | 11/2012 | Robinson et al. |
| 2012/0296991 A1 | 11/2012 | Spivack et al. |
| 2012/0317276 A1 | 12/2012 | Muniraju |
| 2012/0317371 A1 | 12/2012 | Gounares et al. |
| 2012/0317389 A1 | 12/2012 | Gounares |
| 2012/0317421 A1 | 12/2012 | Gounares |
| 2012/0317551 A1 | 12/2012 | Hecht et al. |
| 2012/0317556 A1 | 12/2012 | Zhu et al. |
| 2012/0317557 A1 | 12/2012 | Garrett et al. |
| 2012/0317577 A1 | 12/2012 | Garrett et al. |
| 2012/0317587 A1 | 12/2012 | Garrett et al. |
| 2012/0323827 A1 | 12/2012 | Lakshmanan et al. |
| 2012/0324454 A1 | 12/2012 | Gounares et al. |
| 2012/0324527 A1 | 12/2012 | Brown et al. |
| 2012/0330700 A1 | 12/2012 | Garg et al. |
| 2013/0007116 A1 | 1/2013 | Strack et al. |
| 2013/0018925 A1 | 1/2013 | Pegg |
| 2013/0042156 A1 | 2/2013 | Srinivasan et al. |
| 2013/0060372 A1 | 3/2013 | Lokowandt et al. |
| 2013/0061212 A1 | 3/2013 | Krause et al. |
| 2013/0067445 A1 | 3/2013 | Gounares |
| 2013/0073523 A1 | 3/2013 | Gounares |
| 2013/0073604 A1 | 3/2013 | Gounares |
| 2013/0073829 A1 | 3/2013 | Gounares et al. |
| 2013/0073837 A1 | 3/2013 | Li et al. |
| 2013/0074049 A1 | 3/2013 | Gounares et al. |
| 2013/0074050 A1 | 3/2013 | Masser et al. |
| 2013/0074055 A1 | 3/2013 | Gounares |
| 2013/0074056 A1 | 3/2013 | Gounares |
| 2013/0074057 A1 | 3/2013 | Gounares |
| 2013/0074058 A1 | 3/2013 | Gounares et al. |
| 2013/0074092 A1 | 3/2013 | Gounares |
| 2013/0074093 A1 | 3/2013 | Gounares |
| 2013/0080642 A1 | 3/2013 | Adam et al. |
| 2013/0080760 A1 | 3/2013 | Li et al. |
| 2013/0080761 A1 | 3/2013 | Garrett et al. |
| 2013/0081005 A1 | 3/2013 | Gounares et al. |
| 2013/0085882 A1 | 4/2013 | Gounares et al. |
| 2013/0086348 A1 | 4/2013 | Marathe et al. |
| 2013/0086564 A1 | 4/2013 | Felch |
| 2013/0091387 A1 | 4/2013 | Bohnet |
| 2013/0091508 A1 | 4/2013 | Srinivasan |
| 2013/0104107 A1 | 4/2013 | De et al. |
| 2013/0117280 A1 | 5/2013 | Donaldson |
| 2013/0117753 A1 | 5/2013 | Gounares et al. |
| 2013/0117759 A1 | 5/2013 | Gounares et al. |
| 2013/0145015 A1 | 6/2013 | Malloy et al. |
| 2013/0145350 A1 | 6/2013 | Marinescu |
| 2013/0159198 A1 | 6/2013 | Cartan |
| 2013/0166886 A1 | 6/2013 | Sasanka et al. |
| 2013/0185433 A1 | 7/2013 | Zhu et al. |
| 2013/0185729 A1 | 7/2013 | Vasic et al. |
| 2013/0187941 A1 | 7/2013 | Noon |
| 2013/0198729 A1 | 8/2013 | Turner et al. |
| 2013/0205009 A1 | 8/2013 | Malloy et al. |
| 2013/0212479 A1 | 8/2013 | Willis |
| 2013/0212594 A1 | 8/2013 | Choi et al. |
| 2013/0219057 A1 | 8/2013 | Li et al. |
| 2013/0219363 A1 | 8/2013 | Wu |
| 2013/0219372 A1 | 8/2013 | Li et al. |
| 2013/0227529 A1 | 8/2013 | Li et al. |
| 2013/0227536 A1 | 8/2013 | Li et al. |
| 2013/0227560 A1 | 8/2013 | McGrath |
| 2013/0227573 A1 | 8/2013 | Morsi et al. |
| 2013/0229416 A1 | 9/2013 | Krajec |
| 2013/0232174 A1 | 9/2013 | Krajec |
| 2013/0232433 A1 | 9/2013 | Krajec |
| 2013/0232452 A1 | 9/2013 | Krajec |
| 2013/0232463 A1 | 9/2013 | Nagaraja |
| 2013/0235040 A1 | 9/2013 | Jackson, Jr. |
| 2013/0254746 A1 | 9/2013 | Balakrishnan et al. |
| 2013/0271480 A1 | 10/2013 | Daynes |
| 2013/0282545 A1 | 10/2013 | Gounares |
| 2013/0283102 A1 | 10/2013 | Krajec et al. |
| 2013/0283240 A1 | 10/2013 | Krajec et al. |
| 2013/0283241 A1 | 10/2013 | Krajec et al. |
| 2013/0283242 A1 | 10/2013 | Gounares et al. |
| 2013/0283246 A1 | 10/2013 | Krajec et al. |
| 2013/0283247 A1 | 10/2013 | Krajec et al. |
| 2013/0283281 A1 | 10/2013 | Krajec et al. |
| 2013/0291113 A1 | 10/2013 | Dewey |
| 2013/0298112 A1 | 11/2013 | Gounares |
| 2013/0318506 A1 | 11/2013 | Sohm et al. |
| 2013/0332913 A1 | 12/2013 | Dickenson |
| 2013/0340077 A1 | 12/2013 | Salsamendi |

(56) References Cited

U.S. PATENT DOCUMENTS

| | | |
|---|---|---|
| 2013/0346479 A1 | 12/2013 | Vilke |
| 2014/0013306 A1 | 1/2014 | Gounares et al. |
| 2014/0013308 A1 | 1/2014 | Gounares |
| 2014/0013309 A1 | 1/2014 | Gounares |
| 2014/0013311 A1 | 1/2014 | Garrett et al. |
| 2014/0019598 A1 | 1/2014 | Krajec et al. |
| 2014/0019756 A1 | 1/2014 | Krajec et al. |
| 2014/0019879 A1 | 1/2014 | Krajec et al. |
| 2014/0019985 A1 | 1/2014 | Krajec et al. |
| 2014/0025572 A1 | 1/2014 | Krajec et al. |
| 2014/0026142 A1 | 1/2014 | Gounares |
| 2014/0040591 A1 | 2/2014 | Gounares |
| 2014/0047084 A1 | 2/2014 | Breternitz |
| 2014/0047272 A1 | 2/2014 | Breternitz |
| 2014/0053143 A1 | 2/2014 | Conrod et al. |
| 2014/0068629 A1 | 3/2014 | Boller |
| 2014/0109101 A1 | 4/2014 | Radhakrishnan et al. |
| 2014/0109188 A1 | 4/2014 | Pavlov |
| 2014/0136233 A1 | 5/2014 | Atkinson et al. |
| 2014/0189650 A1 | 7/2014 | Gounares |
| 2014/0189651 A1 | 7/2014 | Gounares |
| 2014/0189652 A1 | 7/2014 | Gounares |
| 2014/0215443 A1 | 7/2014 | Voccio et al. |
| 2014/0215444 A1 | 7/2014 | Voccio et al. |
| 2014/0278539 A1 | 9/2014 | Edwards |
| 2014/0281726 A1 | 9/2014 | Garrett et al. |
| 2014/0282597 A1 | 9/2014 | Garrett et al. |
| 2014/0317454 A1 | 10/2014 | Gataullin et al. |
| 2014/0317603 A1 | 10/2014 | Gataullin et al. |
| 2014/0317604 A1 | 10/2014 | Gataullin et al. |
| 2014/0317605 A1 | 10/2014 | Gataullin et al. |
| 2014/0317606 A1 | 10/2014 | Gataullin et al. |
| 2014/0359126 A1 | 12/2014 | Breternitz |
| 2014/0365544 A1 | 12/2014 | Moffitt |
| 2014/0365545 A1 | 12/2014 | Moffitt |
| 2015/0029193 A1 | 1/2015 | Krajec |
| 2015/0032971 A1 | 1/2015 | Tian et al. |
| 2015/0033172 A1 | 1/2015 | Krajec |
| 2015/0066869 A1 | 3/2015 | Seto et al. |
| 2015/0067652 A1 | 3/2015 | Seto et al. |
| 2015/0067654 A1 | 3/2015 | Seto et al. |
| 2015/0074278 A1 | 3/2015 | Maes |
| 2015/0082285 A1 | 3/2015 | Li et al. |
| 2015/0163288 A1 | 6/2015 | Maes |
| 2015/0195372 A1 | 7/2015 | Zheng |
| 2015/0205588 A1 | 7/2015 | Bates et al. |
| 2015/0212928 A1 | 7/2015 | Gounares |
| 2015/0222548 A1 | 8/2015 | Krajec et al. |
| 2015/0242303 A1 | 8/2015 | Gautallin et al. |
| 2015/0301920 A1 | 10/2015 | Krajec et al. |
| 2015/0304409 A1 | 10/2015 | Steuer |
| 2015/0331720 A1 | 11/2015 | Huetter et al. |
| 2015/0347268 A1 | 12/2015 | Garrett et al. |
| 2015/0347273 A1 | 12/2015 | Krajec et al. |
| 2015/0347277 A1 | 12/2015 | Gataullin et al. |
| 2015/0347283 A1 | 12/2015 | Gataullin et al. |
| 2015/0347628 A1 | 12/2015 | Krajec |
| 2016/0035115 A1 | 2/2016 | Krajec |
| 2016/0077951 A1 | 3/2016 | Krajec et al. |
| 2016/0133035 A1 | 5/2016 | Krajec |
| 2016/0266998 A1 | 9/2016 | Gautallin et al. |
| 2016/0283345 A1 | 9/2016 | Gounares et al. |
| 2016/0283362 A1 | 9/2016 | Seto et al. |

FOREIGN PATENT DOCUMENTS

| | | |
|---|---|---|
| CN | 101627388 | 1/2010 |
| CN | 101933001 | 12/2010 |
| CN | 102460408 | 5/2012 |
| CN | 102567115 | 7/2012 |
| CN | 102592079 | 7/2012 |
| CN | 102789409 | 11/2012 |
| EP | 610581 | 8/1994 |
| EP | 2390790 | 11/2011 |
| EP | 2553583 | 2/2013 |
| JP | 2012208830 | 10/2012 |
| KR | 2012138586 | 12/2012 |
| WO | 0007100 | 2/2000 |
| WO | 2010039893 | 4/2010 |
| WO | 2011116988 | 9/2011 |
| WO | 2011142720 | 11/2011 |
| WO | 2011146750 | 11/2011 |
| WO | 2012106571 | 8/2012 |
| WO | 2014120263 | 8/2014 |

OTHER PUBLICATIONS

Supplementary European Search Report issued in EPO Application No. 14801342.8 dated Apr. 10, 2017.

Bita Mazloom et al: "Dataflow Tomography", ACM Transactions on Architecture and Code Optimization, vol. 9, No. 1, Mar. 2012, pp. 1-26.

Lienhard A. et al: "Taking an object-centric view on dynamic information with object flow analysis", Computer Languages Systems & Structures, Pergamon, Amsterdam, NL, vol. 25, No. 1, Apr. 2009, pp. 63-79.

Extended European Search Report issued in EPO Patent Application No. 14829908.4 dated Apr. 11, 2017.

Office Action dated Apr. 3, 2017 cited in U.S. Appl. No. 14/671,449.

Notice of Allowance dated May 5, 2017 cited in U.S. Appl. No. 14/883,554.

Chinese Office Action issued in CN Application No. 201380072856.3 dated May 15, 2017.

"Extended Search Report Issued in European Patent Application No. 14843127.3", dated Apr. 13, 2017, 9 Pages.

Extended European Search Report issued in European Patent Application No. 14862130.3 dated May 24, 2017.

First Office Action and Search Report Issued in Chinese Patent Application No. 201380075253.9, dated Apr. 5, 2017, 27 Pages.

U.S. Appl. No. 14/820,957, dated May 19, 2017, Notice of Allowance.

U.S. Appl. No. 15/036,325, dated May 24, 2017, Notice of Allowance.

U.S. Appl. No. 13/949,994, dated May 19, 2017, Office Action.

U.S. Appl. No. 13/757,570, dated May 19, 2017, Office Action.

Chinese Office Action issued in CN Patent Application No. 201480035488.X dated May 26, 2017.

U.S. Appl. No. 14/671,449, dated Jun. 23, 2017, Notice of Allowance.

Chinese Office Action issued in China Patent Application No. 201380075071.1. dated Mar. 3, 2017.

"Non-Final Office Action Issued in U.S Appl. No. 14/883,554", dated Feb. 22, 2017, 14 pages.

Office Action issued in Chinese Patent Application No. 201380075229.5 dated Mar. 1, 2017.

Office Action issued in Chinese Patent Application No. 201480029533.0 dated Mar. 20, 2017.

Chinese Office Action issued in China Patent Application No. 201380072861.4. dated Mar. 9, 2017.

Extended European Search Report issued in EPO application No. 14785777.5 dated Mar. 16, 2017.

Notice of Allowance dated Apr. 5, 2017 cited in U.S Appl. No. 13/899,504.

European Search Report for EP 14801342 dated Dec. 6, 2016.

Vetter et al. "Real-Time Performance Monitoring, Adaptive Control, and Interactive Steering of Computational Grids", International Journal of High Performance Computing Applications, vol. 14, No. 4, 2000, pp. 357-366.

"Supplementary Search Report Issued in European Patent Application No. 13875046.8", dated Sep. 5, 2016, 13 pages.

"Supplementary Search Report Issued in European Patent Application No. 13874921", dated Sep. 8, 2016.

Office Action dated Nov. 17, 2016 cited in U.S Appl. No. 13/757,570.

"Supplementary Search Report Issued in European Patent Application No. 14785777", dated Nov. 3, 2016.

Ravindranath, et al. "Appinsight: Mobile App Performance Monitoring in the Wild", Usenix, Apr. 11, 2013 pp. 1-14.

(56) References Cited

OTHER PUBLICATIONS

Graham et al. "Gprot: A Call Graph Execution Profiler", PLDI 09: Proceedings of the 2009 ACM Sigplan Conference on Programming Language Design and Implementation, Jun. 15-20, 2009.
"Notice of Allowance Issued in U.S. Appl. No. 14/455,156", dated Jun. 3, 2015, 22 Pages.
"Notice of Allowance Issued in U.S. Appl. No. 14/455,170", dated Jul. 2, 2015, 13 Pages.
"Notice of Allowability Issued in U.S. Appl. No. 14/455,170", dated Feb. 10, 2016, 2 Pages.
"Notice of Allowance Issued in U.S. Appl. No. 14/455,202", dated Jul. 30, 2015, 16 Pages.
"Notice of Allowability Issued in U.S. Appl. No. 14/455,202", dated Feb. 4, 2016, 2 Pages.
"Notice of Allowance Issued in U.S. Appl. No. 14/455,156", dated Nov. 9, 2015, 21 Pages.
"Notice of Allowance Issued in U.S. Appl. No. 14/455,170", dated Nov. 24, 2015, 11 Pages.
"Notice of Allowance Issued in U.S. Appl. No. 14/455,202", dated Dec. 9, 2015, 17 Pages.
"International Search Report Issued in PCT Application No. PCT/IB2014/060233", dated Nov. 11, 2014, 4 Pages.
Office Action dated Dec. 1, 2016 issued in U.S Appl. No. 14/820,957.
Office Action dated Dec. 14, 2016 issued in U.S Appl. No. 13/867,057.
"Supplementary Search Report Issued in European Patent Application No. 13875228.2", dated Dec. 16, 2016.
International Search Report and Written Opinion for PCT/US2013/043492 dated Nov. 6, 2013.
Grossbart "JavaScript Profiling with the Chrome Developer Tools" Smashing Magazine website Jun. 12, 2012.
"Method and System for Automatically Tracking User Interactions and Providing Tags to the User Interactions" Dec. 4, 2010.
Whitehead "Java Run-Time Monitoring, Part 2:Postcompilation Instrumentation and Performance Monitoring Interception, Class Wrapping, and Bytecode Instrumentation" IBM.com Aug. 5, 2008.
Kinsey "Under the Hood: The JavaScript SDK—Error Handling" Nov. 1, 2012.
Cantrill "Instrumenting the Real-Time Web: Node.js in Production" Node Summit 2012 Presentation; Jan. 24-25, 2012.
"Remote Debugging in Visual Studio 2012 on Windows 8" On Error Resume Next: Coding Through Life, One Day at the Time. Retrieved Jun. 14, 2016.
Narayanasamy et al. "BugNet Continuously Recording Program Execution for Deterministic Replay Debugging" Jun. 2005, 12 pages.
Dong et al. "Hybrid Checkpointing Using Emerging Nonvolatile Memories for Future Exascale Systems" Oct. 2004.
Erik-Svensson et al. "Mpreplay Architecture Support for Deterministic Replay of Message passing Programs on MessagePassing Many-core Processors" Sep. 2009.
Gerofi et al. "Workload Adaptive Checkpoint Scheduling of Virtual Machine Replication" 2011.
Wu et al. "Error Recovery in Shared Memory Multiprocessors Using Private Caches" Apr. 1990.
"International Search Report Issued in PCT Application No. PCT/US2014/011798", dated Jun. 20, 2014, 3 pages.
"International Search Report and Written Opinion", Korea Intellectual Property Office, PCT/U52014/011733, May 8, 2014, 10062-02.
Aguilera, et al., "Performance Debugging for Distributed Systems of Black Boxes", ACM, 2003, pp. 74-89.
Hsu, et al., "Visibility Enhancement for Silicon Debug", ACM, 2006, pp. 13-18.
Kaya, et al., "Error Pattern Analysis of Augmented Array Codes Using a Visual Debugging Tool", IEEE, 2006, pp. 1-6.
LabVIEW, "Debugging Techniques", Jun. 2011, 7 pages. Available at http://zone.ni.com/reference/en-XX/help/371361H-01/1vconcepts/debug_techniques/.
Kumar, et al., "Visualization of Clustered Directed Acyclic Graphs with Node Interleaving", ACM, pp. 1800-1805, Mar. 2009.
Natour, "On the Control Dependence in the Program Dependence Graph", ACM, pp. 510-519, 1988. (The month of Publication is irrelevant since the year of Publication is clearly prior to the filing of the Application).
Ioannidis et al., "Transitive Closure Algorithms Based on Graph Traversal", ACM Transactions on Database sSystems, vol. 18, No. 3, pp. 512-579, Sep. 1993.
Fu, et al., "De-anonymizing Social Graphs via Node Similarity", ACM, pp. 263-264, Apr. 2014.
Supplementary Search Report Issued in European Patent Application No. 13873476.9, dated Aug. 2, 2016, 10 pages.
Barbosa et al. "Interactive SNMP Traffic Analysis Through Information Visualization" In Proceedings of the IEEE Network Operations and Management Symposium (NOMS), Apr. 19, 2010, pp. 73-79.
Dobrev et al. "Visualization of Node Interaction Dynamics in Network Traces" In Proceedings of the 3rd International Conference on Autonomous Infrastructure, Management and Security, AIMS 2009, Enschede, Jun. 30, 2009, pp. 147-160.
Joyce et al. "Monitoring Distributed Systems" In Journal of ACM Transactions on Computer Systems (Tocs), vol. 5, Issue 2, May 1, 1987, pp. 121-150.
Heer et al. "Prefuse" CHI 2005, Conference Proceedings, Conference on Human Factors in Computing Systems; Apr. 2 2005, pp. 421-430.
Ungar, et al., "Self", ACM, 2007, pp. 1-50.
Anonymous "Time Series Analysis" Mar. 7, 2008.
Gephi Tutorial Layouts, Gephi, Jun. 13, 2011.
International Search Report and Written Opinion for PCT/US2013/047211 dated Nov. 27, 2013.
International Search Report and Written Opinion for PCT/US2013/043811 dated Nov. 28, 2013.
International Search Report and Written Opinion for PCT/US2013/046925 dated Nov. 25, 2013.
International Search Report and Written Opinion for PCT/US2013/046918 dated Nov. 25, 2013.
International Search Report and Written Opinion for PCT/US2013/044193 dated Oct. 29, 2013.
International Search Report and Written Opinion for PCT/US2013/046050 dated Nov. 8, 2013.
International Search Report and Written Opinion for PCT/US2013/046922 dated Dec. 17, 2013.
International Search Report and Written Opinion for PCT/US2013/043522 dated Nov. 6, 2013.
International Search Report and Written Opinion for PCT/US2013/046664 dated Nov. 20, 2013.
International Search Report and Written Opinion for PCT/US2013/042789 dated Sep. 30, 2013.
International Search Report and Written Opinion for PCT/US2013/042030 dated Oct. 24, 2013.
International Search Report and Written Opinion for PCT/US2013/042081 dated Oct. 24, 2013.
International Search Report and Written Opinion for PCT/US2013/042788 dated Sep. 5, 2013.
International Search Report and Written Opinion for PCT/US2013/073894 dated Apr. 1, 2014.
International Search Report and Written Opinion for PCT/US2013/075876 dated Apr. 7, 2014.
International Search Report and Written Opinion for PCT/US2013/073935 dated Mar. 31, 2014.
International Search Report and Written Opinion for PCT/US2014/011727 dated May 16, 2014.
European Search Report for EP 13873299 dated Sep. 21, 2016.
TLR "Automagically Wrapping JavaScript Callback Functions" Oct. 22, 2008.
U.S Appl. No. 13/751,012, dated Jan. 29, 2014, Office Action.
U.S Appl. No. 13/751,012, dated Mar. 11, 2014, Office Action.
U.S Appl. No. 13/751,026, dated Apr. 16, 2014, Office Action.
U.S Appl. No. 13/853,769, dated May 9, 2014, Office Action.
U.S Appl. No. 13/765,654, dated Jun. 26, 2014, Office Action.
U.S Appl. No. 13/853,769, dated Jul. 8, 2014, Office Action.

(56) References Cited

OTHER PUBLICATIONS

U.S Appl. No. 13/765,663, dated Jul. 11, 2014, Office Action.
U.S Appl. No. 13/757,598, dated Jul. 17, 2014, Office Action.
U.S Appl. No. 13/899,500, dated Jul. 21, 2014, Office Action.
U.S Appl. No. 13/899,504, dated Jul. 21, 2014, Office Action.
U.S Appl. No. 13/765,648, dated Jul. 28, 2014, Office Action.
U.S Appl. No. 13/765,642, dated Jul. 31, 2014, Office Action.
U.S Appl. No. 13/765,657, dated Aug. 1, 2014, Office Action.
U.S Appl. No. 13/757,625, dated Aug. 13, 2014, Office Action.
U.S Appl. No. 13/867,057, dated Aug. 14, 2014, Office Action.
U.S Appl. No. 13/765,651, dated Aug. 14, 2014, Office Action.
U.S Appl. No. 13/765,642, dated Aug. 15, 2014, Office Action.
U.S Appl. No. 13/765,648, dated Aug. 19, 2014, Notice of Allowance.
U.S Appl. No. 13/751,026, dated Aug. 20, 2014, Office Action.
U.S Appl. No. 13/765,654, dated Aug. 21, 2014, Office Action.
U.S Appl. No. 13/765,657, dated Aug. 27, 2014, Notice of Allowance.
U.S Appl. No. 13/899,507, dated Sep. 11, 2014, Office Action.
U.S Appl. No. 13/899,503, dated Sep. 12, 2014, Office Action.
U.S Appl. No. 13/751,012, dated Sep. 30, 2014, Notice of Allowance.
U.S. Appl. No. 13/916,561, dated Oct. 2, 2014, Office Action.
U.S Appl. No. 13/757,570, Nov. 14, 2014, Office Action.
U.S Appl. No. 13/757,625, dated Jan. 2, 2015, Office Action.
U.S. Appl. No. 13/899,507, dated Jan. 7, 2015, Office Action.
U.S. Appl. No. 13/916,568, dated Jan. 14, 2015, Notice of Allowance.
U.S. Appl. No. 13/916,571, dated Jan. 15, 2015, Notice of Allowance.
U.S. Appl. No. 13/765,642, dated Jan. 26, 2015, Notice of Allowance.
U.S. Appl. No. 13/765,654, dated Jan. 26, 2015, Notice of Allowance.
U.S. Appl. No. 13/899,500, dated Feb. 4, 2015,4 Notice of Allowance.
U.S. Appl. No. 13/916,563, dated Feb. 12, 2015, Office Action.
U.S. Appl. No. 13/765,651, dated Feb. 13, 2015, Office Action.
U.S. Appl. No. 13/916,566, dated Feb. 13, 2015, Office Action.
U.S. Appl. No. 13/757,598, dated Feb. 13, 2015, Office Action.
U.S. Appl. No. 13/853,816, dated Feb. 25, 2015, Office Action.
U.S. Appl. No. 13/916,561, dated Mar. 4, 2015, Notice of Allowance.
U.S. Appl. No. 13/899,503, dated Mar. 11, 2015, Office Action.
U.S. Appl. No. 13/899,504, dated Mar. 11, 2015, Office Action.
U.S. Appl. No. 13/757,631, dated Mar. 17, 2015, Office Action.
U.S. Appl. No. 13/867,057, dated Mar. 19, 2015, Office Action.
U.S. Appl. No. 14/455,156, dated Jun. 3, 2015, Notice of Allowance.
U.S. Appl. No. 13/853,769, dated Jun. 22, 2015, Office Action.
U.S. Appl. No. 14/455,170, dated Jul. 2, 2015, Notice of Allowance.
U.S. Appl. No. 13/949,978, dated Jul. 10, 2015, Notice of Allowance.
U.S. Appl. No. 13/757,570, dated Jul. 29, 2015, Office Action.
U.S. Appl. No. 13/757,582, dated Aug. 7, 2015, Office Action.
U.S. Appl. No. 14/629,322, dated Aug. 26, 2015, Office Action.
U.S. Appl. No. 13/853,816, dated Sep. 9, 2015, Office Action.
U.S. Appl. No. 14/820,798, dated Sep. 24, 2015, Office Action.
U.S. Appl. No. 13/757,631, dated Sep. 25, 2015, Notice of Allowance.
U.S. Appl. No. 13/899,503, dated Nov. 3, 2015, Office Action.
U.S. Appl. No. 13/899,504, dated Nov. 6, 2015, Office Action.
U.S. Appl. No. 13/949,978, dated Nov. 13, 2015, Notice of Allowance.
U.S. Appl. No. 14/629,322, dated Nov. 20, 2015, Notice of Allowance.
U.S. Appl. No. 13/757,582, dated Dec. 21, 2015, Notice of Allowance.
U.S. Appl. No. 13/757,625, dated Jan. 2, 2016, Office Action.
U.S. Appl. No. 13/853,769, dated Feb. 19, 2016, Office Action.
U.S. Appl. No. 14/995,872, dated Feb. 26, 2016, Office Action.
U.S. Appl. No. 14/820,798, dated Apr. 6, 2016, Notice of Allowance.
U.S. Appl. No. 14/820,834, dated Apr. 20, 2016, Notice of Allowance.
U.S. Appl. No. 14/642,192, dated May 23, 2016, Notice of Allowance.
U.S. Appl. No. 14/666,120, dated May 24, 2016, Office Action.
U.S. Appl. No. 13/899,504, dated May 26, 2016, Office Action.
U.S. Appl. No. 13/853,769, dated Jun. 2, 2016, Notice of Allowance.
U.S. Appl. No. 13/899,503, dated Jun. 2, 2016, Office Action.
U.S. Appl. No. 13/867,057, dated Jun. 3, 2016, Office Action.
U.S. Appl. No. 14/995,872, dated Jun. 9, 2016, Notice of Allowance.
U.S. Appl. No. 14/617,509, dated Jul. 20, 2016, Office Action.
U.S. Appl. No. 14/582,973, dated Aug. 11, 2016, Notice of Allowance.
U.S. Appl. No. 13/949,994, dated Aug. 26, 2016, Office Aciton.
U.S. Appl. No. 13/853,816, dated Sep. 12, 2016, Notice of Allowance.
U.S. Appl. No. 13/899,503, dated Oct. 5, 2016, Office Action.
Office Action dated Dec. 30, 2016 cited in U.S. Appl. No. 13/899,504.
Notice of Allowance dated Jan. 20, 2017 cited in U.S. Appl. No. 14/666,120.
Huang et al. "Force-Transfer: A New Approach to Removing Overlapping Nodes in Graph Layout", ACM, pp. 1-10, 2003.
Nusayr et al. "Using AOP for Detailed Runtime Monitoring Instrumentation", ACM, pp. 8-14, 2009.
Reiss, "Visualization Program Execution Using User Abstractions", ACM, pp. 125-134, 2006.
Office Action dated Dec. 23, 2016 cited in U.S. Appl. No. 14/617,509.

* cited by examiner

MODULE SPECIFIC TRACING IN A SHARED MODULE ENVIRONMENT

CROSS REFERENCE TO RELATED APPLICATIONS

This application is a continuation of U.S. patent application Ser. No. 14/455,156 filed on Aug. 8, 2014, entitled "MODULE SPECIFIC TRACING IN A SHARED MODULE ENVIRONMENT," which issued as U.S. Pat. No. 9,292,416 on Mar. 22, 2016, which claims the benefit of and priority to U.S. Provisional Patent Application Ser. No. 61/873,773 filed on Sep. 4, 2013 and entitled "MODULE SPECIFIC TRACING IN A SHARED MODULE ENVIRONMENT," the entirety of each of which are incorporated herein by reference.

BACKGROUND

Application tracing is one mechanism to understand and monitor an application. Tracing is a mechanism to collect data while the application executes. In some uses, application tracing may be used for monitoring the ongoing performance of an application. In other uses, application tracing may be used by a developer to understand an application, identify any problems, and improve the application.

In many computer languages and communities, some code may be distributed as modules, libraries, or other reusable components. These modules may be distributed as source code, intermediate code, executable code, or some other form, but may all share the characteristic that the modules may be reused by other programmers in many different applications.

SUMMARY

A module-specific tracing mechanism may trace the usage of a module on behalf of the module developer. The module may be used by multiple application developers, and the tracing system may collect and summarize data for the module in each of the different applications. The data may include usage data as well as performance data. Usage data may include anonymized data for each time the module may be invoked and called, and performance data may include the processing time, memory consumption, and other metrics. The module-specific tracing may be enabled or disabled by an application developer.

A tracing system may trace applications and their modules, and may make module-specific data available through various interfaces. The tracing system may collect tracer data while an application executes, and may preprocess the data into application-specific and module-specific databases. An analysis engine may further analyze and process these databases to create application-specific views and module-specific views into the data. The application-specific views may be intended for a developer of the application, while the module-specific views may have a public version accessible to everybody and a module developer version that may contain additional details that may be useful to the module developer.

A database of module performance may be generated by adding tracing components to applications, as well as by adding tracing components to modules themselves. Modules may be reusable code that may be made available for reuse across multiple applications. When tracing is performed on an application level, the data collected from each module may be summarized in module-specific databases. The module-specific databases may be public databases that may assist application developers in selecting modules for various tasks. The module-specific databases may include usage and performance data, as well as stability and robustness metrics, error logs, and analyses of similar modules. The database may be accessed through links in module description pages and repositories, as well as through a website or other repository.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Module Specific Tracing System

Figure 1:
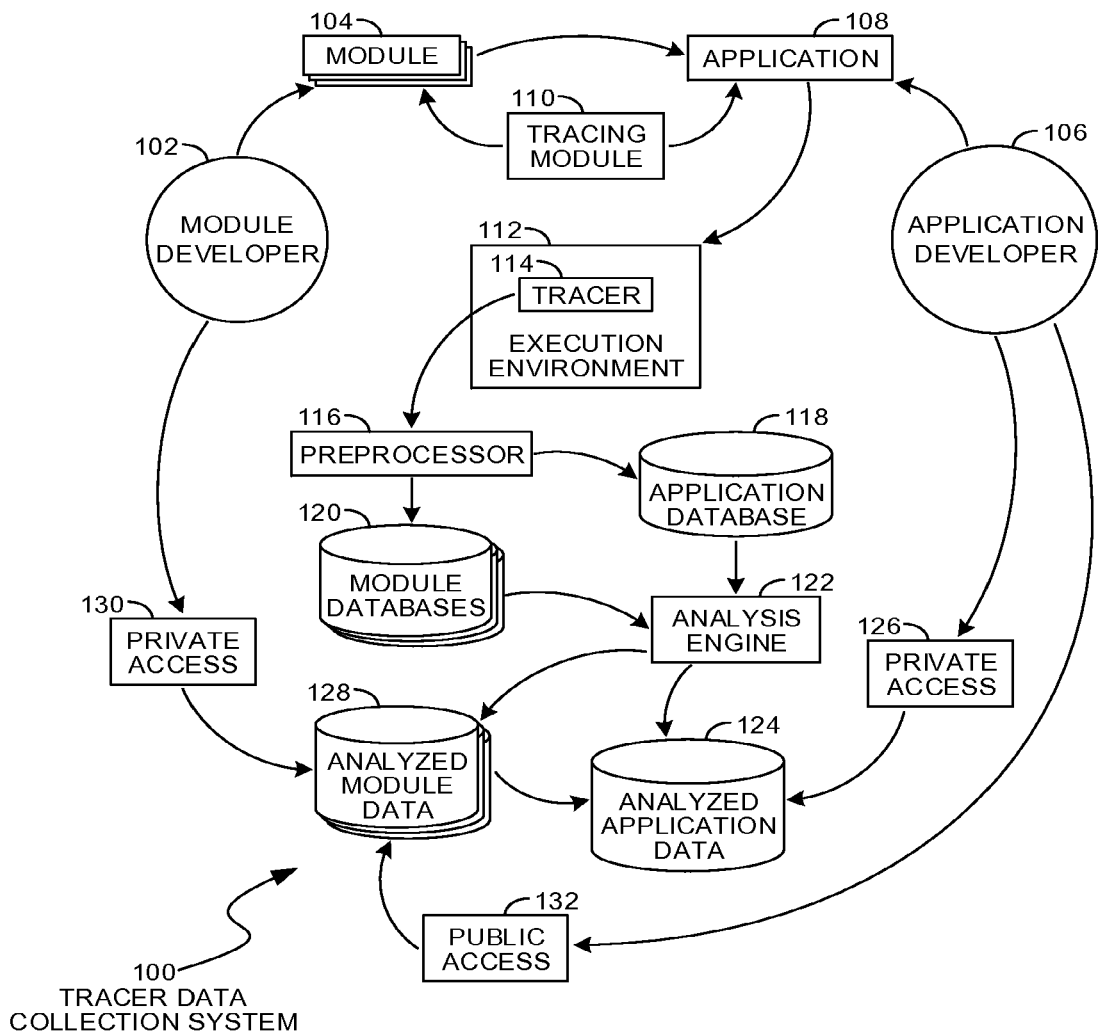
FIG. 1 is a diagram illustration of an embodiment showing a system for tracing applications and modules.

A tracing system may collect data about modules that may be incorporated into multiple applications. The modules may be shared sets of code that may be distributed among developers, and the developers may select various modules to incorporate into their applications.

Some of the modules may incorporate a tracing mechanism, which may trace the operations of the module and store tracer data. The tracer data may include usage data, which may describe the number of uses, timestamps for uses, conditions under which the module was used, and other usage data. The tracer data may also include performance data, such as the amount of time taken to execute, amount of computational resources, memory resources, network resources, or other resources consumed during execution.

The module specific tracing system may consolidate the raw data for the module developer and for other users. Some embodiments may include a detailed view of the data for module developers and a less detailed view for other users. Module developers may use the tracer data to identify portions of the module that may be executing poorly or have some other issue. The other users may examine the module tracing data to determine a general notion of performance of the module and may use the tracing data as part of the criteria for comparing and selecting one module over another.

In one use scenario, a module developer may incorporate a tracing mechanism in the module. The tracing mechanism may operate within the confines of the module and only trace code within the module. In many cases, the tracing mechanism may be able to gather some metadata about the environment in which the module was executed.

The tracing mechanism may gather tracing data while the module executes in an application. The tracing mechanism may transmit the tracing data to a database for analysis. In many cases, the application developer may have an option to turn off the tracing mechanism or set various options for the tracing mechanism, even though the tracing mechanism may have been initially incorporated and configured by the module developer.

In the use scenario, the tracing mechanism may gather usage and performance data that the module developer may use to improve the module. These tracer data may help the module developer understand which portions of the module are used more frequently than others, which may help the module developer prioritize improving the most used portions. The tracer data may also help identify code that is less reliable than other code, and the data may be used to generate robustness or fragility measurements of individual functions.

In another use scenario, an application developer may access the module specific data to gauge whether or not to use the module in a particular application. The developer may have identified several modules that may serve a particular purpose, and then may use the tracer data as one metric to select between the modules. The application developer may investigate the module's reliability and robustness by viewing the performance and usage data.

Tracing System for Application and Module Tracing

A tracing system may provide tracing for applications and modules using similar techniques and mechanisms yet with some differences. The tracing system may gather tracing data while an application executes, and that data may be shared with the application developer, the module developer, and a wider audience of potential module users. In some cases, the wider audience may be public at large.

Each of the three audiences may have different uses for the tracer data and different security concerns. The application developer may view the application as a trade secret, and may not wish certain tracer information be shared outside of the team developing the application. The module developer may wish to collect data on how the module performed, but may not wish for some details of the operations be disclosed to the general public. The public at large may include developers who may be building their own applications, and these developers may wish to view the module specific data to determine whether or not the module is suited for their use.

The application developer may request tracing be performed on their application. Such tracing data may include tracing information that may be proprietary, such as the values of data elements handled by the application, the application architecture and function, source code of the application, and other information. Because the application developer may consider this as secret or proprietary, such information may be processed and stored in a database that may be separate from the data that may be shared with the module developer and the public at large.

The data collected for each module may be collected when the application is executed. As such, module-specific data collection may be a subset of the available data because the module-specific data may be shared with a module developer who may be another party other than the application development team. In some cases, the module developer may be a third party who may create and disseminate a module without knowing who may use the module in their application.

The module-specific data may be collected as part of executing an application, but only those subsets of data that the application developer may permit to be collected may actually be collected. In many cases, the application developer may have a set of configuration settings that may enable or disable certain types of data to be collected. In some cases, certain data elements may not be collected at all for module-specific tracing.

In some cases, an application developer may disable or not install application-level tracing but may permit a module developer to collect tracer data as a module executes within the application. In such situations, an application may execute without tracing, but when the module is executed, the tracing may occur only within the module. Such module-specific tracing may be processed and made available to the module developer and, in some cases, a wider audience. In such cases, the module-specific tracing may be much more limited in scope than if the application developer had enabled tracing for the entire application.

When an application developer enables tracing for an entire application and permits tracing for individual modules, the application developer may be able to view a complete set of the data relating to each module, with a subset of the data being transmitted and processed in the module-specific manner. In such a situation, the application developer may have access to a superset of data for a specific module than the module developer would be able to access.

Module Database with Tracing Options

A module database may use tracing data to decorate descriptions of modules. The module database may list various modules that may be incorporated into applications. The decorations may include performance and usage data, as well as summaries and other data that may be useful for evaluating modules and comparing modules against each other.

The module database may be constructed by analyzing tracer data gathered while an application executes a module. A tracer may gather performance and usage data for the module during execution, and these data may be aggregated, summarized, and displayed for a user to browse.

The tracer data may include actual usage of the module by third parties, as well as the manners in which the module was incorporated into various applications. The application developers may select and use a module but may only exercise a subset of the module's functionality. In many cases, a module may have many different functions, methods, objects, or other components, yet an application developer may use one a small subset of the components.

The third party usage may be gathered when the application is used by an end user. For example, an application may consist of an app that runs on a mobile device along with a backend component that executes on a server in a datacenter. The end user may exercise the application in many different manners, some of which may exercise the module and some which may not.

The usage data may reflect the popularity and usefulness of the various components of the module. When these data may be presented to the module developer or to other application developers, the data may be arranged as a popularity score or percentage.

The usage data may be tracked over time to determine which applications continue to use the module and which modules are being included and removed from various applications. In many cases, an application developer may select a module, use the module for a short period of time, then switch to another module. In such a situation, the application developer made a conscious decision to switch from one module to another, indicating the application developer's preference for the second module over the first. This preference may be valuable to another application developer who may be considering the use of the first module.

The performance data for the various functions or components within the module may be used to develop a reliability or robustness metric for each function. The reliability or robustness metric may be an indicator of how fragile a function may be, and may be useful for an application developer when selecting specific functions for incorporation in their application. The reliability or robustness metric may be based on the variance of performance metrics or other factors.

The module database may include graphical or other indicators of the architecture of the module. In many cases, a module may include several other modules, each of which may be invoked when an application executes. Such complex interactions may not be readily apparent from reading the source code or from other sources. The graphical representation of the module may give an application developer a visual indication of the complexity of the module and the various dependencies.

The module database may roll up or aggregate various metrics about the dependencies of a module to generate data for a given module. The various use and performance data of the modules may be apportioned to the various modules that actually perform the underlying functions. For example, a module may call a second module to perform certain tasks, and one of those tasks may be performed by a third module. In such a case, the first module's function may be displayed along with the second and third module's functions and the data collected from each of the dependencies.

Throughout this specification and claims, the term "module" is used to define a group of reusable code that may be incorporated into an application. A module may be known as a 'library', 'subroutine', or some other notion. For the purposes of this specification and claims, these terms are considered synonymous.

The "module" may be code that is arranged in a way that multiple applications may access the code, even though the applications may have no connection with each other. In general, a "module" may be code that is configured to be reused. In some cases, a module may be reused within the scope of a large application, while in other cases, the module may be shared to other application developers who may use the module in disparate and unconnected applications.

Many programming languages and paradigms have a notion of a "module" or library, where the module may have a defined interface through which an application may invoke and use the module. Some paradigms may allow a programmer to incorporate a module in a static manner, such that the module code does not further change after the application is written and deployed. Some paradigms may allow for dynamic libraries, which may be loaded and invoked at runtime or even after execution has begun. The dynamic libraries may be updated and changed after the application may have been distributed, yet the manner of invoking the libraries or modules may remain the same.

Modules may be distributed in source code, intermediate code, executable code, or in some other form. In some cases, modules may be services that may be invoked through an application programming interface.

Throughout this specification and claims, the terms "profiler", "tracer", and "instrumentation" are used interchangeably. These terms refer to any mechanism that may collect data when an application is executed. In a classic definition, "instrumentation" may refer to stubs, hooks, or other data collection mechanisms that may be inserted into executable code and thereby change the executable code, whereas "profiler" or "tracer" may classically refer to data collection mechanisms that may not change the executable code. The use of any of these terms and their derivatives may implicate or imply the other. For example, data collection using a "tracer" may be performed using non-contact data collection in the classic sense of a "tracer" as well as data collection using the classic definition of "instrumentation" where the executable code may be changed. Similarly, data collected through "instrumentation" may include data collection using non-contact data collection mechanisms.

Further, data collected through "profiling", "tracing", and "instrumentation" may include any type of data that may be collected, including performance related data such as processing times, throughput, performance counters, and the like. The collected data may include function names, parameters passed, memory object names and contents, messages passed, message contents, registry settings, register contents, error flags, interrupts, or any other parameter or other collectable data regarding an application being traced.

Throughout this specification and claims, the term "execution environment" may be used to refer to any type of supporting software used to execute an application. An example of an execution environment is an operating system. In some illustrations, an "execution environment" may be shown separately from an operating system. This may be to illustrate a virtual machine, such as a process virtual machine, that provides various support functions for an application. In other embodiments, a virtual machine may be a system virtual machine that may include its own internal operating system and may simulate an entire computer system. Throughout this specification and claims, the term "execution environment" includes operating systems and other systems that may or may not have readily identifiable "virtual machines" or other supporting software.

Throughout this specification and claims, the term "application" is used to refer to any combination of software and hardware products that may perform a desired function. In some cases, an application may be a single software program that operates with a hardware platform. Some applications may use multiple software components, each of which may be written in a different language or may execute within different hardware or software execution environments. In some cases, such applications may be dispersed across multiple devices and may use software and hardware components that may be connected by a network or other communications system.

Throughout this specification, like reference numbers signify the same elements throughout the description of the figures.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is an illustration of an example embodiment 100 showing a tracer data collection system. Embodiment 100 may be an overview of a process that collects tracer data from an application. The tracer data may fall into application-specific or module-specific classifications, and may be handled differently based on the classification.

A tracer may be incorporated into individual modules or an application as a whole. The tracer output may be used to populate a module database, which may be used by application developers to evaluate, compare, and select modules for their application. The module database may include records for each module for which the tracing system has gathered data.

In some use cases, a module developer may incorporate a tracing mechanism into a module. In such a case, each time the module is incorporated into an application and executed, the embedded tracer may collect data for that module. Unless the tracer is configured otherwise, the tracer may gather data for that module but not for the remainder of the application.

The tracer data may be accessed in multiple manners. Module developers may access tracer data for their modules and view more detailed tracer data than the general public, which may have access to a subset of the tracer data for the module. Application developers may access application-specific data, which may be more detailed than the data available to the module developers or the general public.

As described above, the three classes of audiences may have different uses of the data and different security concerns. For the application developer, the application may be a proprietary project that may include trade secrets or other information that the application developer may not wish to share. This application-specific data may include, for example, the control and sequence of the application, data types handled by the application, the raw data processed by the application, and other information that may be proprietary. As such, the application-specific data may be stored in a separate database than module-specific data and access to the application-specific data may be limited to authorized users.

In many cases, the module developer may have created and distributed a module so that application developers may reuse the module. Module developers may be commercial software companies as well as open source software developers. Such developers may desire to see their modules in use, either for commercial purposes or for the satisfaction of contributing to the community.

The tracer data that may be collected from an application but made available to the module developers may be sanitized, anonymized, or otherwise scrubbed to remove proprietary information from the data. Such operations may limit the application-specific information in the module traces, but may enable the module developer to have access to the module specific data.

A module developer may access module-specific data to monitor the deployment and use of the module, as well as to identify performance issues with the module. The module-specific data may also be made available to a wider audience, such as the general public. The general public may make use of the module-specific data to compare and select modules.

A module developer 102 may contribute modules 104, which may be used by an application developer 106 to build an application 108. A tracing module 110 may be incorporated into individual modules 104 or into the application 108. When a tracing module 110 is incorporated into one or more modules 104, those modules may be traced. When a tracing module 110 is incorporated into the application 108, all of the application 108 may be traced, including any modules included in the application 108.

The application 108 may be executed in an execution environment 112. During execution, a tracer 114 may gather data, which may be passed to a preprocessor 116. In many cases, the tracer 114 may gather data and transmit those data to the preprocessor 116 on a periodic basis.

The preprocessor 116 may perform lightweight analyses, formatting, or other processing, then store application-specific data in an application database 118 and module-specific data in various module databases 120. In many cases, the module databases 120 may be configured with a separate database for each module that may be traced.

An analysis engine 122 may perform further analysis of the stored data to produce analyzed application data 124 or analyzed module data 126, respectively. The analysis engine 122 may perform many different types of analyses, including analyzing historical data, summarizing usage and performance statistics, graphing and charting data, and other analyses. In some cases, the analysis engine 122 may perform analyses on demand, meaning that some analyses may be performed when the analyzed data may be requested. In other cases, the analysis engine 122 may perform analyses ahead of time so that the analyzed data may be readily available when requested.

A module developer 102 may have private access 130 to the analyzed module data 128. The module developer's private access of the module-specific data may include details about performance and usage. In contrast, an application developer 106 may have public access 132 to the analyzed module data 128, which may contain fewer details and only a subset of the data available through the private access 130 of the module developer 102.

The public access 132 may include summaries of the tracer data collected for the module, including performance and usage statistics. An example of such a user interface may be found later in this specification.

An application developer 106 may have private access 126 to the analyzed application data 124. This access may include extensive data regarding the performance of the application as a whole, including the performance of the various modules. In some cases, the application developer 106 may be able to access more data or a different set of data than a module developer 104. For example, an application developer 106 may be able to access parameter values passed to a module, where the parameter values may be proprietary and not available to the module developer 104.

The application developer 106 may have control over which types of data may be made available to the module databases 120. For example, the application developer 106 may fully turn off any sharing of the module-specific data, but such data may still be collected, stored, and made available through the private access 126 of the application developer 106.

The application developer 106 may place various limits on the data that may be shared in the module databases. For example, the application developer 106 may permit usage statistics to be collected, but may not permit values of variables to be collected. The application developer 106 may establish that the data may be obfuscated or anonymized prior to being included in the module databases 120.

Figure 2:
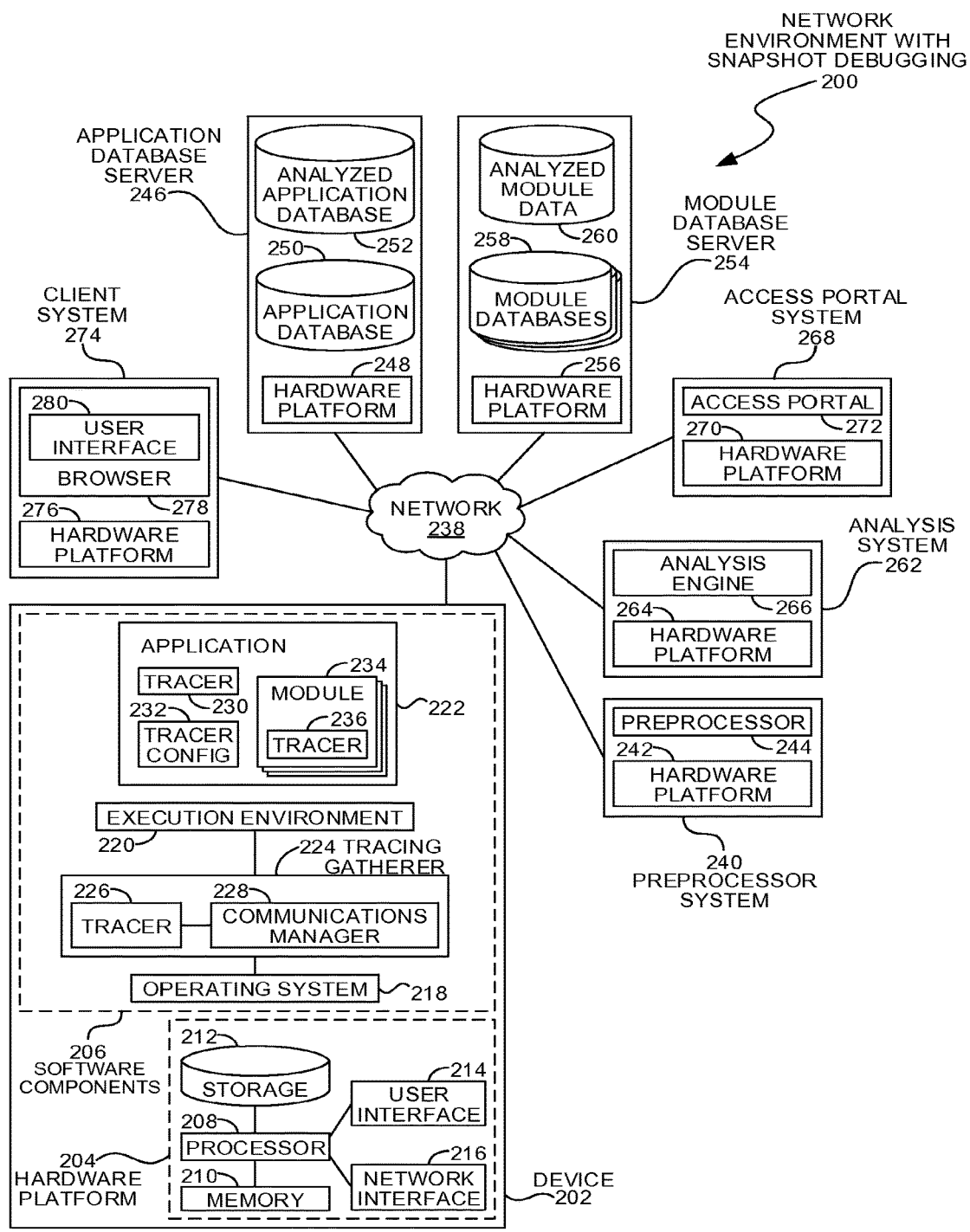
FIG. 2 is a diagram illustration of an embodiment showing a network environment with devices that may collect and view application and module trace data.

FIG. 2 is a diagram of an embodiment 200 showing components that may collect data when an application executes and present various user interfaces showing the collected data. The example of embodiment 200 is merely one example of a multi-device system that may generate and view tracer data. Other architectures may include single device and multiple device architectures.

The architecture of embodiment 200 includes a device 202 on which the tracer data may be collected, as well as several other devices for storing and processing different elements of the collected data. A client device may present and view the collected data. In other embodiments, some or all of the functions illustrated may be combined into one or more devices.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate. Depending on the embodiment, the application 222 may be executed in an operating system 218 or in an execution environment 220. An execution environment 220 may have memory management, process scheduling, and other components that may manage application execution in a similar manner to an operating system 218.

A tracing gatherer 224 may work with either the operating system 218 or execution environment 220. The tracing gatherer 224 may include a tracer 226 and a communications manager 228. The tracer 226 may monitor the operations of the application 222, while the communications manager 228 may transmit the tracer data to a preprocessor system 240.

The tracer 226 and communications manager 228 may be components of a tracer that may be included in the application 222. The application 222 may have a tracer 230 which may trace the entire application 222, including all of the modules 234. When a module developer wishes to trace their module, a tracer 236 may be included in the specific module 234 to be traced.

The application 222 may include a tracer configuration 232 which may define different parameters for the tracer. In some cases, the tracer configuration 232 may define which data elements may be collected, the precision of the data being collected, which data elements may be shared with module developers, and other items. In some cases, the tracer configuration 232 may define one configuration for one module and a different configuration for another module.

The communications manager 228 may package and transmit tracer data to a preprocessor system 240, which may be accessed over a network 238. The preprocessor system 240 may have a hardware platform 242, which may be similar to the hardware platform 204, and on which a preprocessor 244 may operate.

The preprocessor 244 may receive tracer data and perform some preliminary processing prior to storing the data in the application database server 246 or the module database server 254. In many cases, the preprocessor 244 may be designed to handle a high volume of tracer data.

The application database server 246 may have a hardware platform 248, which may be similar to the hardware platform 204, on which two databases may operate. An application database 250 may contain application-specific tracer data in raw or preprocessed form. An analyzed application database 252 may contain analyzed application data that may be ready for viewing by an application developer.

The module database server 254 may have a hardware platform 256, which may be similar to the hardware platform 204, on which two databases may operate. A module database 258 may contain module-specific tracer data in raw or preprocessed form. An analyzed module database 260 may contain analyzed module data that may be ready for viewing by a module developer or a third party.

An analysis system 262 may have a hardware platform 264, which may be similar to the hardware platform 204, on which an analysis engine 266 may execute. The analysis engine 266 may perform various analyses of the application tracer data or module tracer data. The analyses may include summarizing the data, combining the tracer data with other data sources, visualizing the data, or other operations on the data.

An access portal system 268 may have a hardware platform 270, which may be similar to the hardware platform 204, on which an access portal 272 may execute. The access portal 272 may be a web service or other application that may gather data from the analyzed application database 252 or the analyzed module database 260 for display on a client system 274. The access portal 272 may include authentication systems, user account and login systems, billing and accounting systems, and other functions.

The client system 274 may have a hardware platform 276, which may be similar to the hardware platform 204, on which a browser 278 may execute. The browser 278 may be used to access the access portal 272 and generate a user interface 280. The user interface 280 may be different based on the user and the user's credentials. For example, application developers may be able to view application data for their applications, as well as the module database for third party or general consumption. Similarly, a module developer may be able to see detailed module-specific data for their modules but not for other modules or for applications. A third party may be able to view module information permitted for general consumption but not be able to access application data or detailed module-specific data.

Figure 3:
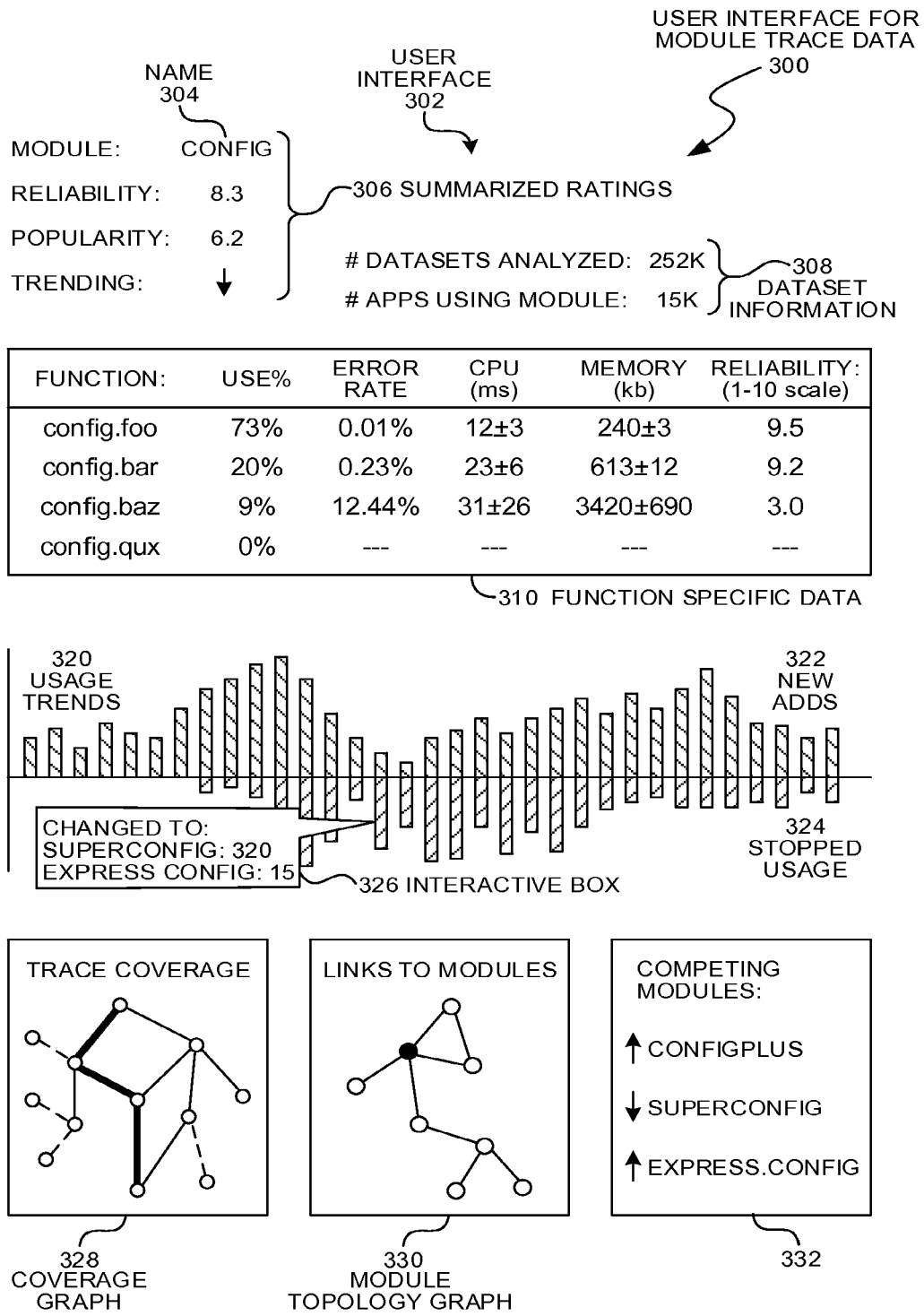
FIG. 3 is a diagram illustration of an example embodiment showing a user interface for module trace data.

FIG. 3 is an example embodiment 300 showing a user interface for module trace data. Embodiment 300 is a user interface 302 that may be an example of a publically available module-specific user interface for a module named CONFIG.

The user interface 302 may represent the type of data that may be publically available after being gathered from a tracer. The tracer may be a module-specific tracer or may be an application-level tracer. The type of data illustrated in the example of embodiment 300 may be merely illustrative as possible types of data and possible methods for aggregating and displaying the data. Other embodiments may have different types of data and mechanisms for communicating the data.

A name 304 may identify the module as CONFIG. A set of summarized ratings 306 may give a user a high level summary of the module's reliability, popularity, and how the module is trending. Reliability may be a metric derived from usage and performance data that may reflect the robustness or fragility of the module as a whole.

Popularity may be a metric that reflects the community's usage of the module. In some cases, the popularity may reflect the module's popularity in comparison to the community as a whole, in comparison to comparable modules, or in some other context.

A trending indicator may indicate if the module is increasing or decreasing in overall popularity and robustness. If the module is being used less and less or if the subsequent releases of the module are poorer performing than previous releases, the trend indicator may be down. Conversely, if the module is gaining users and each release of the module increases reliability, the trend may be upwards.

The reliability, popularity, and trending indicators are merely three examples of high level summary indicators that may be useful for a user interface describing a particular module.

A set of dataset information 308 may display the quantity of data that may underlie the displayed data. In the example, the number of datasets analyzed may be 252,000 and the number of applications using the module may be 15,000. These numbers may lend credibility to the overall data, giving the views confidence that the performance and usage data are based on a statistically significant population of data.

A set of function-specific data 310 may show observations for individual functions within a module. Many modules may include multiple functions, objects, or other components, each of which may be called or invoked individually. In the example, lines 314, 316, 318, and 320 may illustrate summary data for config.foo, config.bar, config.baz, and config.qux, respectively.

The type of function-specific data may include a use percentage, which may indicate which of the functions are used the most. In the case of config.qux, the use percentage may be 0, which may occur when no trace data exists for the function. In one example of an analysis routine, the source code for the config module may be read to identify each of the available functions. The list of functions may be compared with the tracer data to generate some of the function specific data 310.

An error rate may be determined for each function, as well as the CPU consumption and memory consumption. The resource consumption of CPU and memory may be given as a mean with a standard deviation. The standard deviation may be one metric of a function's stability or reliance. A reliability score for the function may also be included. The reliability score may be determined using an algorithm or heuristic that may capture the variance in resource consumption.

A graph of usage trends 320 may be one mechanism that shows usage of the function over time. In the case of the graph of usage trends 320, the top portion 322 of the graph may show new applications that add the module, while the bottom portion 324 may show applications that no longer use the module.

In some cases, a module may be added to an application during an initial phase, then removed later when an application developer elects to change out the module for another one. This usage pattern is one mechanism that may indicate that the second module may be better suited for the application that the current module. When a tracing system can capture or infer such behavior, the desirability of the second module may be strongly indicated and the undesirability of the first module may also be strongly indicated. These types of patterns may be very valuable feedback that may be passed to the module developer who may investigate and improve their module, as well as an application developer who may be searching for a module.

The graph may be interactive, and an example interactive box 326 may be placed on the user interface when a user hovers or clicks on one of the bars in the graph. The interactive box 326 may show underlying data for the selected bar.

A coverage graph 328 may visually illustrate the components of the module for which trace data exists. An example of a coverage graph may be found later in this specification.

Similarly, a module topology graph 330 may visually illustrate the links between the current module and other modules that the current module may call. An example of a module topology graph may be found later in this specification.

A competing modules area 332 may list similar or competitive modules to the current module. The modules listed may have hot links, buttons, or other mechanisms that may cause the user interface to change to that module. The competing modules may include indicators showing the relative strength of the other modules, the module's trends, or some other indicators.

Figure 4:
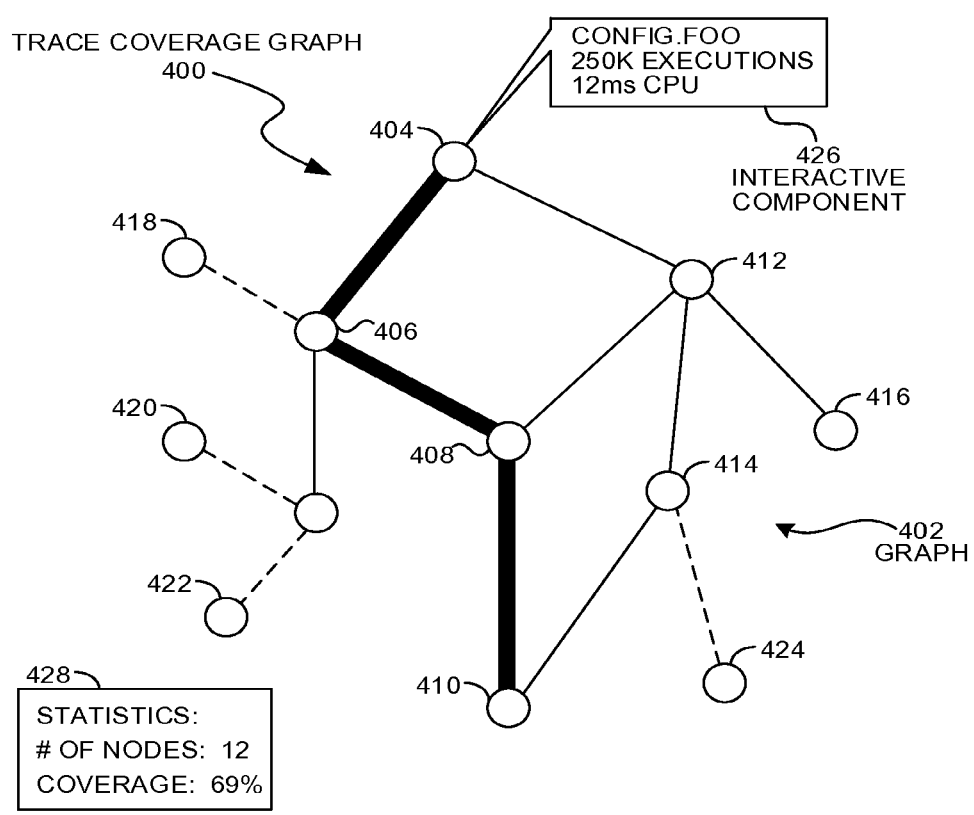
FIG. 4 is a diagram illustration of an embodiment showing an example trace coverage graph.

FIG. 4 is an example diagram of an embodiment 400 showing a trace coverage graph. The graph 402 may show various functions or components of a module as the nodes of the graph. The edges of the graph may reflect the connections or sequences of execution of the nodes, and may be drawn to reflect amount of data that were used to generate the coverage graph.

In many embodiments, each of the nodes of graph 402 may be labeled with references to the executable code represented by each of the nodes. For the sake of simplicity in the figure, such labels have been removed.

In the example of embodiment 400, nodes 404, 406, 408, and 410 may be connected with thick, heavy lines. Such lines may indicate that a large amount of trace data may be present for that sequence of execution. In contrast, the sequence of node 404, 412, 414, and 416 may have much less supporting data. In the case of nodes 418, 420, 422, and 424, the dashed lines may indicate that no trace data may be available. In such a case, the code associated with nodes 418, 420, 422, and 424 may never have been exercised by an application.

The graph 402 may be an interactive graph. As an example of an interaction, a user may hover, click, select, or otherwise indicate node 404 and an interactive component 426 may be displayed. The interactive component 426 may display additional underlying data about the node.

Figure 5:
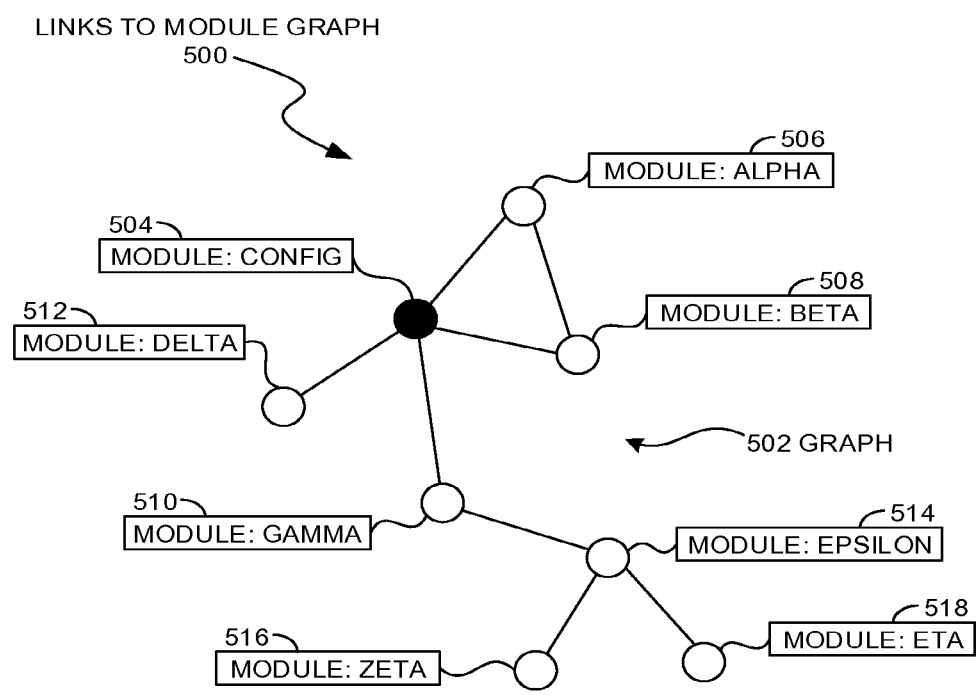
FIG. 5 is a diagram illustration of an embodiment showing an example module topology graph.

FIG. 5 is an example diagram of an embodiment 500 showing a module topology graph. The graph 502 may show a module and its dependencies, which may be other modules that may be included or called from the base module. The nodes of the graph may reflect the base module and its dependencies. The edges of the graph may reflect the connections or function calls to the dependent modules.

The graph 502 may be a visual image of the call structure of a module, and may be used to give a user a graphical view of the complexity and dependencies of a module.

A module config 504 may be illustrated as a shaded or highlighted node. This node may represent the base node for the graph. The nodes 506, 508, 510, 510, 512, 514, 516, and 518 may represent modules alpha, beta, gamma, delta, epsilon, zeta, and eta, respectively. The interconnections illustrate the function calls or other dependencies between modules.

In the example of embodiment 500, the module config 504 is shown to call node 510, module gamma, which in turn calls node 514, module epsilon. Module epsilon, node 514, calls modules zeta and eta, as represented by nodes 516 and 518. This structure may communicate to a viewer how module eta on node 518 relates to module config 514.

Figure 6:
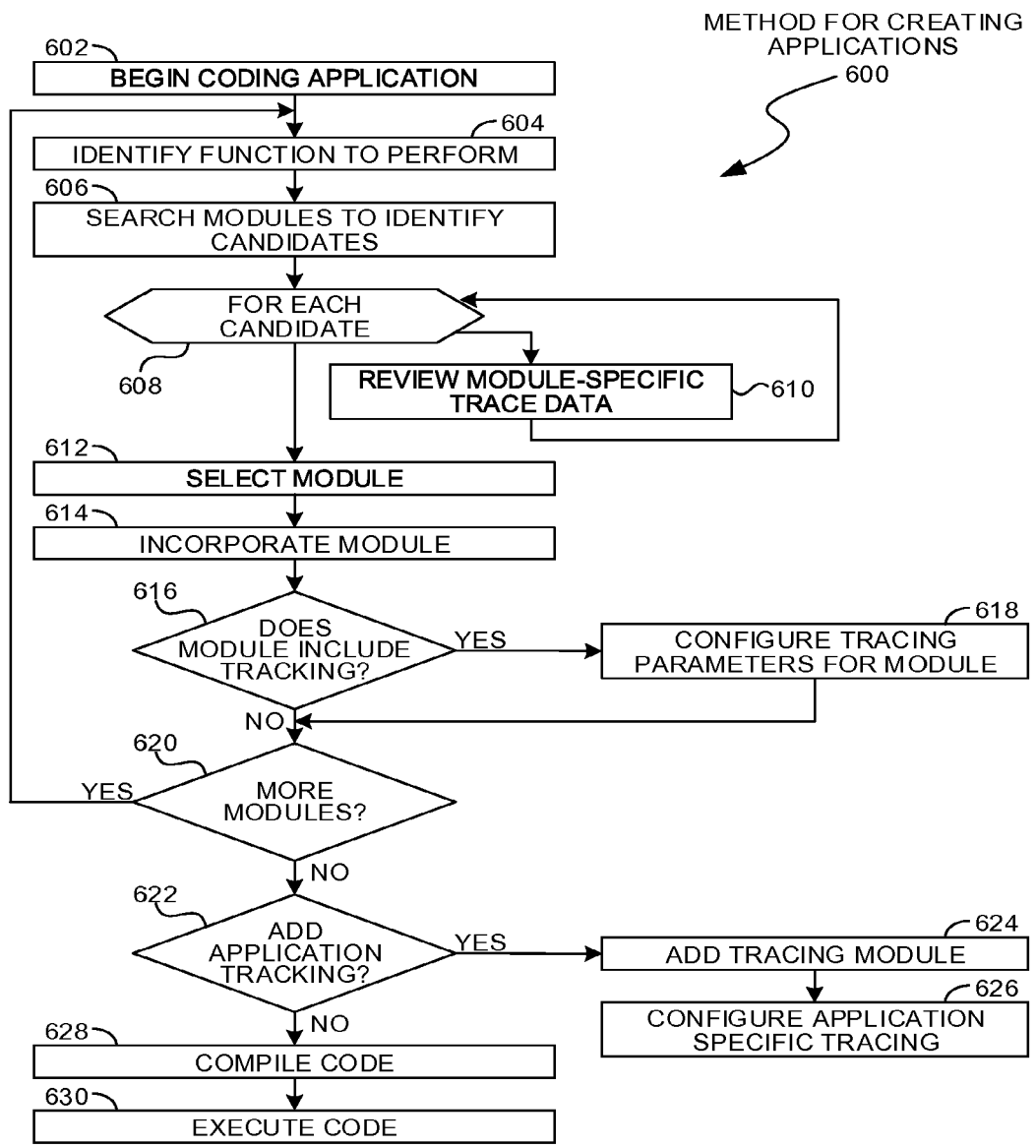
FIG. 6 is a flowchart illustration of an embodiment showing a method for creating applications.

FIG. 6 is a flowchart illustration of an embodiment 600 showing a method for creating applications. Embodiment 600 illustrates a general method that an application developer may use to create an application that includes one or more modules or libraries.

A developer may begin coding an application block 602. While coding, the developer may identify a function in block 604 that may prompt a search in block 606 for modules that may perform the function. From the list of candidate modules in block 606, the developer may evaluate each candidate in block 608.

The developer may examine the module-specific trace data in block 610 for each of the candidate modules. An example of such data may be found in the user interface of embodiment 300. From these data, the developer may be able to select an appropriate module in block 612 and incorporate the module into the application in block 614.

If the module developer has added tracing in block 616, the application developer may be able to configure various tracing parameters for the module in block 618. The tracing parameters may allow the application developer to select different options for the tracer.

The tracing parameters may be configured in many different manners to allow the application developer to control how the module may be traced. The module tracing may be requested by a module developer to address specific goals that the module developer may have, yet the application developer may have the final approval and control over how the module tracing may occur. In many cases, the application developer may be able to completely disable tracing for the module, as well as to limit or expand some of the parameters that a tracer may collect.

The tracing frequency may be part of the tracer configuration. In many embodiments, tracing may consume processing and memory resources. As such, the tracing may be performed on a sampling basis or may have other architectures that limit the amount of resources consumed by tracing.

The application developer may be incented to permit tracing for the module because the module tracing data may be fed back to the module developer to help improve the module, as well as to further populate a public database for the module. At this point, the application developer may have already accessed the public database in block 610 and may wish to give back to the community by permitting the module tracing.

If the application developer identifies another function that may be implemented in a module in block 620, the process may return to block 604, otherwise the process may continue to block 622.

In block 622, the application developer may wish to add application specific tracing. If so, a tracing module may be added in block 624 and the application specific tracing may be configured in block 626.

The application developer may compile the code in block 628 and execute the code in block 630.

Figure 7:
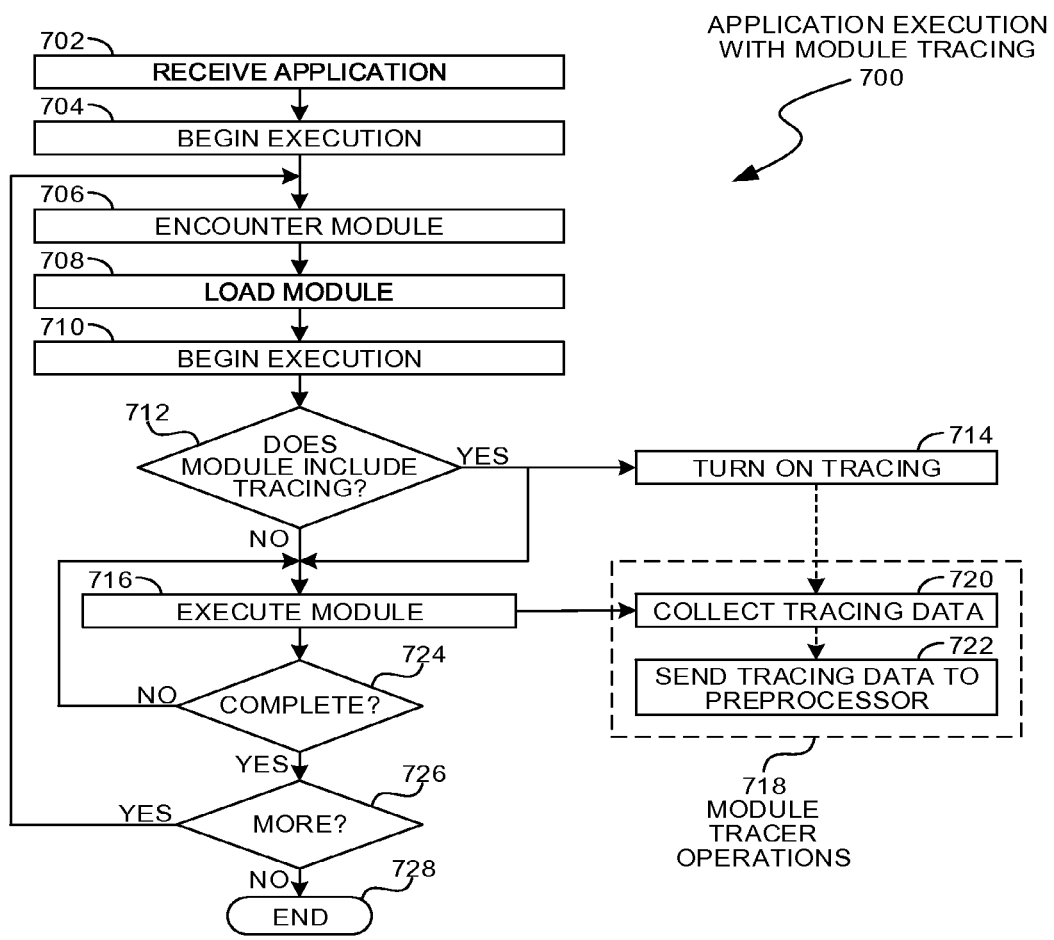
FIG. 7 is a flowchart illustration of an embodiment showing a method for application execution with module tracing.

FIG. 7 is a flowchart illustration of an embodiment 700 showing a method for executing applications with module tracing.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 700 illustrates how an application may be executed with module-specific tracing. The module-specific tracing may occur only when the module executes and may not operate when other portions of the application execute.

An application may be received in block 702 and begin execution in block 704. During execution, a module may be encountered in block 706. The module may be loaded in block 708 and begin execution in block 710.

If the module includes tracing in block 712, tracing may be turned on in block 714. The tracing may be performed by a separate thread or process, or may be incorporated into a single thread with the module itself. If the tracing is not included in the module, the tracing may not be turned on.

While the module executes in block 716, the module tracer operations in block 718 may be performed. The module tracer may collect tracing data in block 720 and send the tracer data to a preprocessor in block 722. In many embodiments, the tracer data may be sent to the preprocessor on a periodic basis, such as every second, every several seconds, every minute, or some other frequency.

The module processing may continue in block 724 by looping back to block 716. When the module is complete in block 724, processing may continue to block 726. When another module is encountered in block 726, the process may loop back to block 706. When processing is complete, the application may end in block 728.

Figure 8:
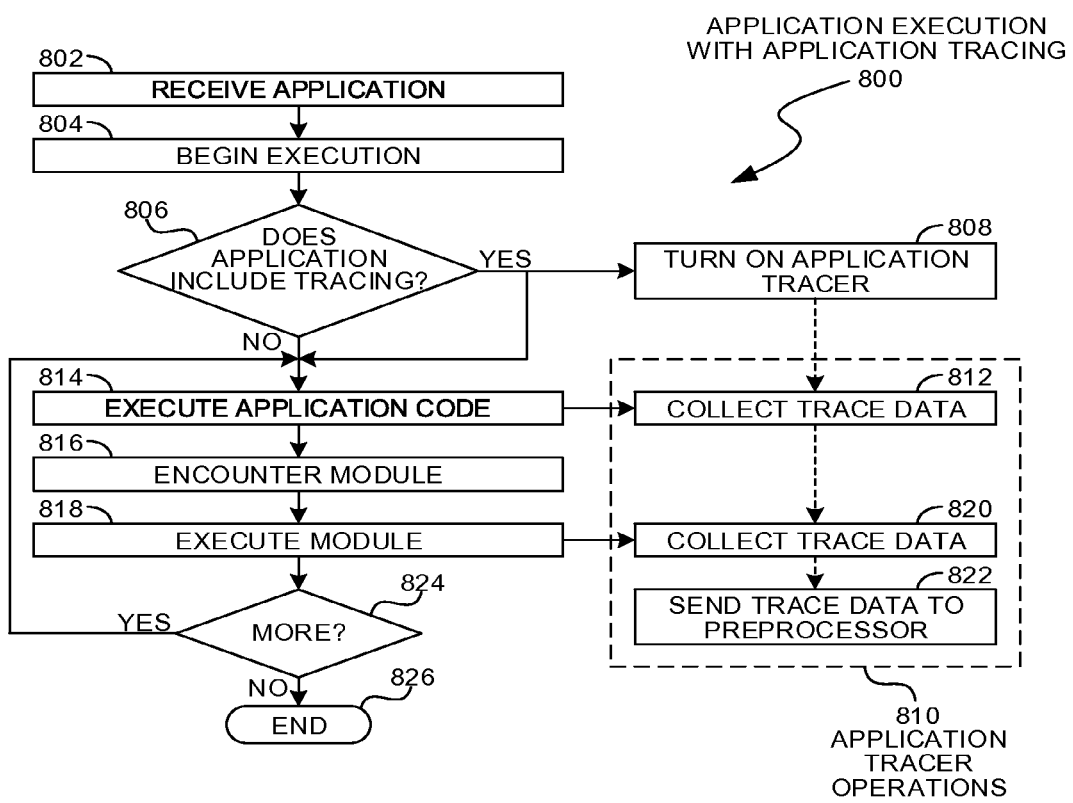
FIG. 8 is a flowchart illustration of an embodiment showing a method for application execution with application tracing.

FIG. 8 is a flowchart illustration of an embodiment 800 showing a method for executing applications with both application and module tracing.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 800 illustrates how an application may be executed with application-specific and module-specific tracing. Application-specific tracing may occur while the application executes, and module-specific tracing may occur while various modules execute. Embodiment 800 may be compared to embodiment 700 where module-specific tracing may occur without application-specific tracing.

An application may be received in block 802 and begin execution in block 804. When the application includes tracing in block 806, application tracing may begin in block 808. The operations of the tracer may be illustrated in block 810.

The application may be executed in block 814. While the application executes in block 814, the tracer may collect application-specific tracer data in block 812.

When the application encounters a module in block 816, the module may be executed in block 818. While the module executes in block 818, the tracer may collect tracer data in block 820.

During the tracer operations of block 810, the tracer may send tracer data to a preprocessor in block 822. The tracer data may be transmitted on a periodic basis, for example.

As more code is to be executed in block 824, the process may loop back to block 814, otherwise the application may end in block 826.

Figure 9:
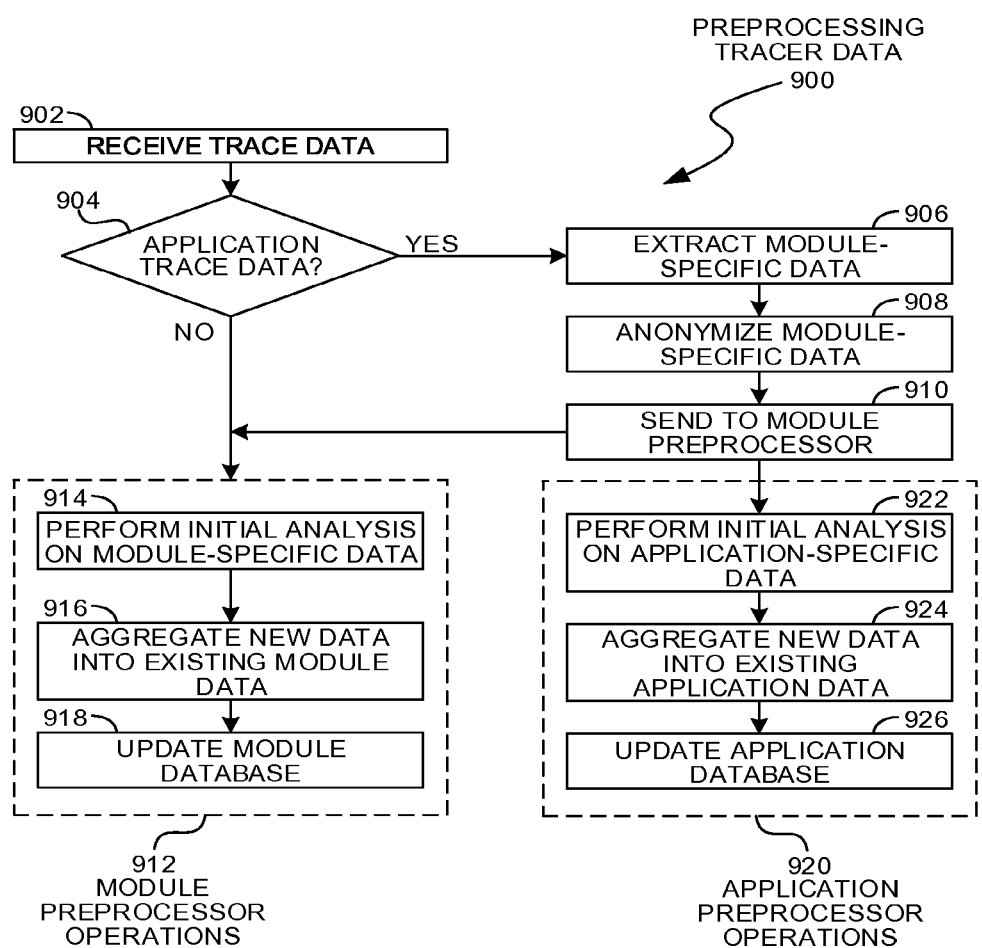
FIG. 9 is a flowchart illustration of an embodiment showing a method for preprocessing tracer data.

FIG. 9 is a flowchart illustration of an embodiment 900 showing a method for preprocessing tracer data. Embodiment 900 may be performed to gather tracer data and dispatch the data to the appropriate databases. The data may be further processed and analyzed by an analysis engine once the data are in the databases.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 900 is one example of a preprocessor. In many embodiments, the preprocessor may handle large volumes of data. Consequently, the preprocessor may perform a limited amount of analysis and may operate in a lightweight fashion. The operations of embodiment 900 may be performed on each packet or message sent from a tracer.

The trace data may be received in block 902. In many cases, the trace data may come in a packet, message, or other form that may contain a group of observations, metadata, and other information gathered by a tracer.

If the trace data is application trace data in block 904, the module-specific data may be extracted in block 906, anonymized in block 908, and sent to a module preprocessor in block 910. If the trace data is module trace data in block 904, the trace data is sent to the module preprocessor.

The extraction and anonymizing of module-specific data in blocks 906 and 908 may remove data that may identify the application, data handled by the application, or other information that may relate to the application. These data may, in some cases, be considered proprietary and therefore are removed prior to being added to the module database.

The operations of a module preprocessor are illustrated in block 912. An initial analysis of the module-specific data may be performed in block 914. The new data may be aggregated into existing module data in block 916, and the module database may be updated in block 918. The data in the module database may be further processed by an analysis engine to generate data viewable by the module developer as well as a wider audience, which may include the general public.

The application-specific data may be processed an application preprocessor as illustrated in block 920. An application preprocessor may perform initial analysis on the application data in block 922, aggregate the new data into existing application data in block 924, and update the application database in block 926.

Figure 10:
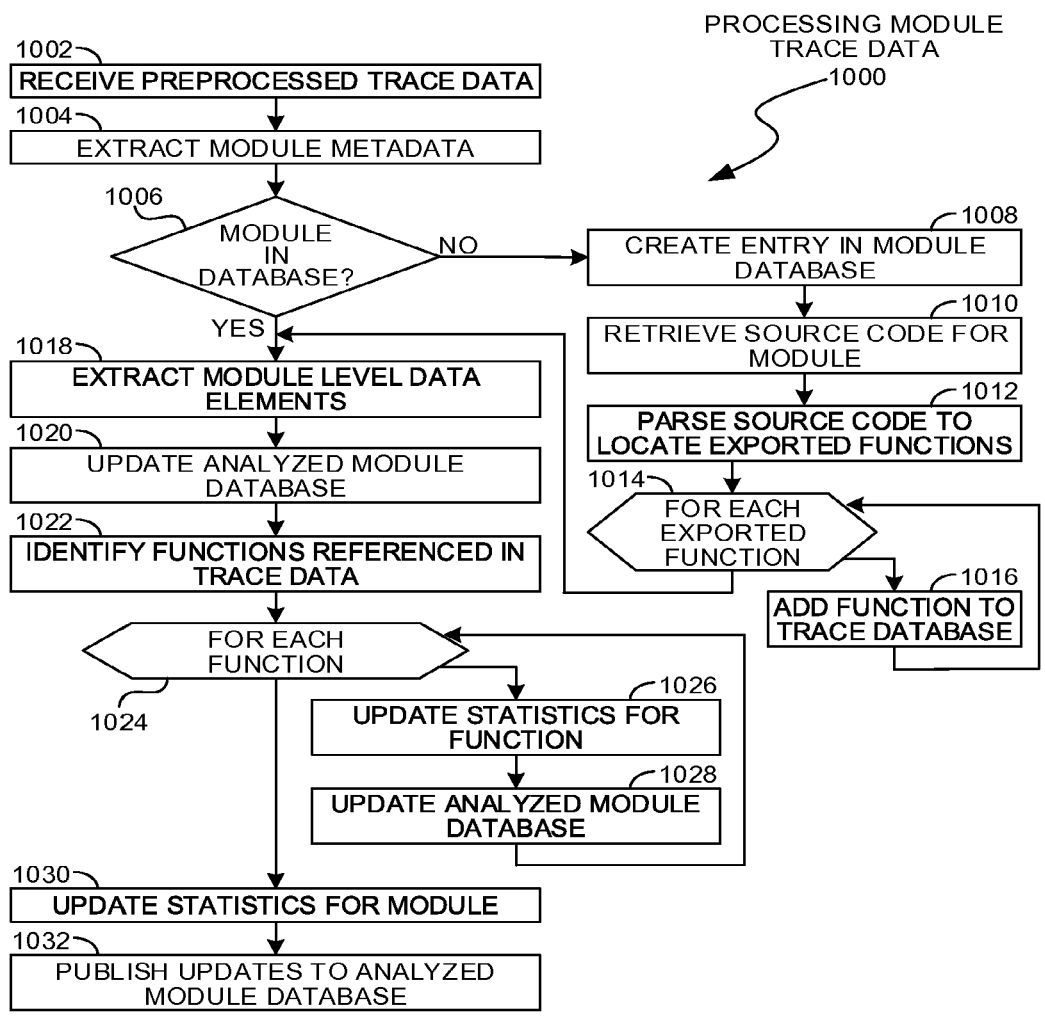
FIG. 10 is a flowchart illustration of an embodiment showing a method for processing module trace data.

FIG. 10 is a flowchart illustration of an embodiment 1000 showing a method for analyzing tracer data. Embodiment 1000 may be performed by an analysis engine to incorporate module trace data into an analyzed module database. From the analyzed module database, the data may be presented to a user with a user interface such as the user interface of embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Preprocessed trace data may be received in block 1002. The module metadata may be extracted from the data in block 1004.

If the module is not in the analyzed module database in block 1006, a process may be executed to add the module to the database beginning in block 1008.

In block 1008, an entry in the analyzed module database may be created. The source code for the module may be retrieved in block 1010 and parsed in block 1012 to locate the exported functions and other objects.

For each of the exported functions or other available objects in block 1014, the function or object may be added to the analyzed trace database in block 1016. The process may continue at block 1018.

If the module is in the database in block 1006, module level data elements may be extracted from the data in block 1018 and the analyzed module database may be updated in block 1020.

The functions or other objects in the data may be identified in block 1022. For each function in block 1024, the statistics relating to the function may be updated in block 1026 and the statistics used to update the analyzed module database in block 1028.

Any statistics for the module as a whole may be updated in block 1030 and the updates may be published in the analyzed module database in block 1032.

Figure 11:
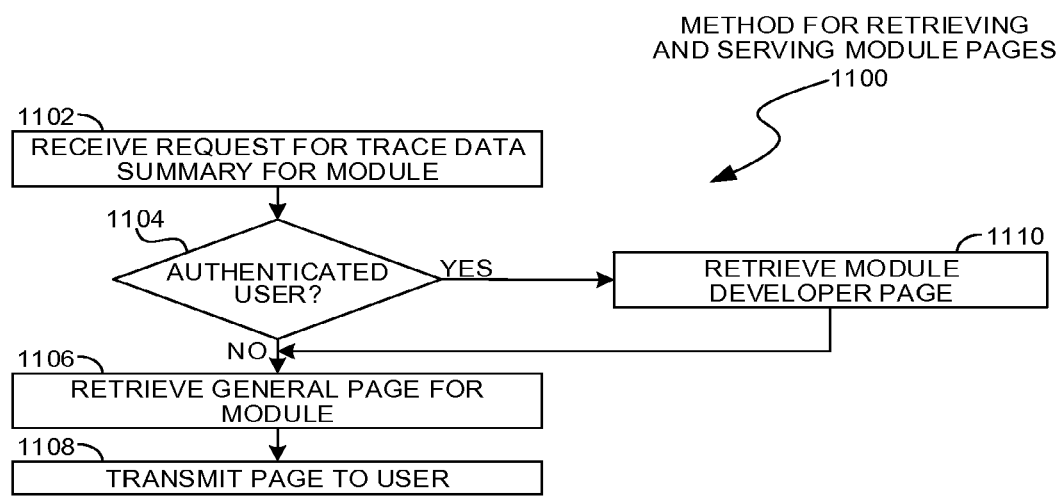
FIG. 11 is a flowchart illustration of an embodiment showing a method for processing requests for module data.

FIG. 11 is a flowchart illustration of an embodiment 1100 showing a method for servicing requests for data from analyzed trace data. Embodiment 1100 may be performed by a portal server in response to a request from a client device.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A request may be received in block 1102 for summary data for a particular module. If the user is not an authenticated user in block 1104, the general data for the module may be retrieved in block 1106 and transmitted to the user in block 1108. If the user is an authenticated user in block 1104, the module developer data may be retrieved in block 1110 and transmitted in block 1108.

In the example of embodiment 1100, the notion of the data being delivered as a 'page' may refer to an example the delivery of the data in the form of a web page. Some embodiments may transmit the data in other manners to be rendered or presented to a user in a user interface.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A computer system, comprising:
   one or more processors;
   a display device; and
   one or more hardware storage devices having stored thereon computer-executable instructions that are executable by the one or more processors to cause the computer system to visualize execution of an application in a trace coverage graph, the computer-executable instructions including instructions that are executable to cause the computer system to perform at least the following:
      receiving module trace data gathered during execution of an executable module that includes a plurality of executable components, wherein the module trace data includes data representing sequences of execution between individual executable components of the plurality of executable components during execution of the executable module;
      based on, at least in part, receiving the module trace data, generating a trace coverage graph for display at the display device, wherein the generated trace coverage graph includes:
         a plurality of different graph nodes, wherein each graph node of the plurality of different graph nodes corresponds to a different individual executable component selected from among the plurality of executable components; and
         a plurality of different graph edges, wherein each graph edge of the plurality of different graph edges visually connects two graph nodes of the plurality of different graph nodes of the generated trace coverage graph representing individual executable components of the plurality of executable components that were executed in sequence during execution of the executable module, wherein the thickness of each graph edge of the plurality of different graph edges visually indicates an amount of trace data present for a sequence of execution between the plurality of different graph nodes that are connected by the graph edge, wherein thicker graph edges represent the presence of a larger amount of trace data and thinner graph edges represent the presence of a lesser amount of trace data, wherein the thicker graph edges are heavier graph edges than the thinner graph edges, and wherein dashed graph edges represent the presence of no trace data, indicating that at least one graph node of the plurality of different graph nodes corresponds to an executable component of the plurality of executable components that was not executed during execution of the executable module; and displaying the generated trace coverage graph at the display device.

2. The computer system of claim 1, wherein each graph node of the plurality of different graph nodes is labeled with a reference to executable code represented by the graph node.

3. The computer system of claim 1, the computer-executable instructions also including instructions that are executable to cause the computer system to receive a user input selecting a graph node and to display additional underlying data about the selected graph node.

4. The computer system of claim 1, wherein the generated trace coverage graph is displayed as part of a module-specific user interface for the executable module.

5. The computer system of claim 4, wherein the module-specific user interface includes one or more module metrics, including one or more of:
 a reliability metric that reflects robustness or fragility of the executable module;
 a popularity metric that reflects usage of the executable module by a community; or
 a trending metric indicating if the executable module is increasing or decreasing in popularity.

6. The computer system of claim 4, wherein the module-specific user interface indicates a quantity of the module trace data.

7. The computer system of claim 4, wherein the module-specific user interface reflects observations for individual functions within the executable module.

8. The computer system of claim 7, wherein the observations for the individual functions within the executable module include one or more of an error rate, processor consumption, or memory consumption for an individual function within the executable module.

9. The computer system of claim 4, wherein the module-specific user interface graphs usage trends of the executable module over time.

10. The computer system of claim 4, wherein the module-specific user interface includes a module topology graph that visually illustrates links between the executable module and one or more other modules that are called by the executable module.

11. A method, implemented at a computer system that includes one or me processors, for visualizing execution of an application in a trace coverage graph, the method comprising:
 analyzing module trace data gathered during execution of an executable module that includes a plurality of executable components, wherein the module trace data includes data representing sequences of execution between individual executable components of the plurality of executable components during execution of the executable module;

based on, at least in part, analyzing the module trace data, generating a trace coverage graph for display at a display device, wherein the generated trace coverage graph includes:
 a plurality of different graph nodes, wherein each graph node of the plurality of different graph nodes corresponds to a different individual executable component selected from among the plurality of executable components; and
 a plurality of different graph edges, wherein each graph edge of the plurality of different graph edges visually connects two graph nodes of the plurality of different graph nodes of the generated trace coverage graph representing individual executable components of the plurality of executable components that were executed in sequence during execution of the executable module, wherein the thickness of each graph edge of the plurality of different graph edges visually indicates an amount of trace data present for a sequence of execution between the plurality of different graph nodes that are connected by the graph edge, wherein thicker graph edges represent the presence of a larger amount of trace data and thinner graph edges represent the presence of a lesser amount of trace data, wherein the thicker graph edges are heavier graph edges than the thinner graph edges, and wherein dashed graph edges represent the presence of no trace data, indicating that at least one graph node of the plurality of different graph nodes corresponds to an executable component of the plurality of executable components that was not executed during execution of the executable module; and displaying the generated trace coverage graph at the display device.

12. The method of claim 11, wherein each graph node of the plurality of different graph nodes is labeled with a reference to executable code represented by the graph node.

13. The method of claim 11, further comprising receiving a user input selecting a graph node and displaying additional underlying data about the selected graph node.

14. The method of claim 11, wherein the generated trace coverage graph is displayed as part of a module-specific user interface for the executable module.

15. The method of claim 14, wherein the module-specific user interface includes one or more module metrics, including one or more of:
 a reliability metric that reflects robustness or fragility of the executable module;
 a popularity metric that reflects usage of the executable module by a community; or
 a trending metric indicating if the executable module is increasing or decreasing in popularity.

16. The method of claim 14, wherein the module-specific user interface indicates a quantity of the module trace data.

17. The method of claim 14, wherein the module-specific user interface reflects observations for individual functions within the executable module.

18. The method of claim 17, wherein the observations for the individual functions within the executable module include one or more of an error rate, processor consumption, or memory consumption for an individual function within the executable module.

19. The method of claim 14, wherein the module-specific user interface graphs usage trends of the executable module over time.

20. The method of claim 14, wherein the module-specific user interface includes a module topology graph that visually illustrates links between the executable module and one or more other modules that are called by the executable module.

21. A computer program product comprising one or more hardware storage devices having stored thereon computer-executable instructions that are executable by one or more processors of a computer system to cause the computer system to visualize execution of an application in a trace coverage graph, the computer-executable instructions including instructions that are executable to cause the computer system to perform at least the following:
  obtaining module trace data gathered during execution of an executable module that includes a plurality of executable components, wherein the module trace data includes data representing sequences of execution between individual executable components of the plurality of executable components during execution of the executable module;
  based on, at least in part, obtaining the module trace data, rendering a trace coverage graph for display at a display device, wherein the rendered trace coverage graph includes:
    a plurality of different graph nodes, wherein each graph node of the plurality of different graph nodes corresponds to a different individual executable component selected from among the plurality of executable components; and
    a plurality of different graph edges, wherein each graph edge of the plurality of different graph edges visually connects two graph nodes of the plurality of different graph nodes of the generated trace coverage graph representing individual executable components of the plurality of executable components that were executed in sequence during execution of the executable module, wherein the thickness of each graph edge of the plurality of different graph edges visually indicates an amount of trace data present for a sequence of execution between the plurality of different graph nodes that are connected by the graph edge, wherein thicker graph edges represent the presence of a larger amount of trace data and thinner graph edges represent the presence of a lesser amount of trace data, wherein the thicker graph edges are heavier graph edges than the thinner graph edges, and wherein dashed graph edges represent the presence of no trace data, indicating that at least one graph node of the plurality of different graph nodes corresponds to an executable component of the plurality of executable components that was not executed during execution of the executable module; and
  displaying the generated trace coverage graph at the display device.

22. A computer system, comprising:
  one or more processors;
  a display device; and
  one or more hardware storage devices having stored thereon computer-executable instructions that are executable by the one or more processors to cause the computer system to visualize execution of an application in a trace coverage graph, the computer-executable instructions including instructions that are executable to cause the computer system to perform at least the following:
    executing an executable module at the one or more processors, including executing a plurality of executable components of the executable module at the one or more processors;
    while executing the executable module, gathering module trace data, including gathering data representing sequences of execution between individual executable components of the plurality of executable components; and
    based on, at least in part, gathering the module trace data, generating a trace coverage graph for display at the display device, wherein the generated trace coverage graph includes:
      a plurality of different graph nodes, wherein each graph node of the plurality of different graph nodes corresponds to a different individual executable component selected from among the plurality of executable components; and
      a plurality of different graph edges, wherein each graph edge of the plurality of different graph edges visually connects two graph nodes of the plurality of different graph nodes of the generated trace coverage graph representing individual executable components of the plurality of executable components that were executed in sequence during execution of the executable module, wherein the thickness of each graph edge of the plurality of different graph edges visually indicates an amount of trace data present for a sequence of execution between the plurality of different graph nodes that are connected by the graph edge, wherein thicker graph edges represent the presence of a larger amount of trace data and thinner graph edges represent the presence of a lesser amount of trace data, wherein the thicker graph edges are heavier graph edges than the thinner graph edges, and wherein dashed graph edges represent the presence of no trace data, indicating that at least one graph node of the plurality of different graph nodes corresponds to an executable component of the plurality of executable components that was not executed during execution of the executable module; and
    displaying the generated trace coverage graph at the display device.

23. The computer system of claim 22, wherein each graph node of the plurality of different graph nodes is labeled with a reference to executable code represented by the graph node.

24. The computer system of claim 22, the computer-executable instructions also including instructions that are executable to cause the computer system to receive a user input selecting a graph node and to display additional underlying data about the selected graph node.

25. The computer system of claim 22, wherein the generated trace coverage graph is displayed as part of a module-specific user interface for the executable module.

26. The computer system of claim 25, wherein the module-specific user interface includes one or more module metrics, including one or more of:
  a reliability metric that reflects robustness or fragility of the executable module;
  a popularity metric that reflects usage of the executable module by a community; or
  a trending metric indicating if the executable module is increasing or decreasing in popularity.

27. The computer system of claim 25, wherein the module-specific user interface indicates a quantity of the module trace data.

28. The computer system of claim 25, wherein the module-specific user interface reflects observations for individual functions within the executable module.

29. The computer system of claim 25, wherein the module-specific user interface graphs usage trends of the executable module over time.

30. The computer system of claim 25, wherein the module-specific user interface includes a module topology graph that visually illustrates links between the executable module and one or more other modules that are called by the executable module.

* * * * *